(12) United States Patent
Denny et al.

(10) Patent No.: US 8,737,357 B2
(45) Date of Patent: *May 27, 2014

(54) CELL-TO-WIFI SWITCHER

(71) Applicant: AT&T Intellectual Property I, L.P., Atlanta, GA (US)

(72) Inventors: Michael Denny, Sharpsburg, GA (US); William Coan, Monroe, WA (US); Vishwa Prasad, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,412

(22) Filed: Nov. 28, 2012

(65) Prior Publication Data

US 2013/0083649 A1    Apr. 4, 2013

Related U.S. Application Data

(63) Continuation of application No. 12/277,063, filed on Nov. 24, 2008, now Pat. No. 8,369,281.

(51) Int. Cl.
*H04W 4/00* (2009.01)
*H04L 12/28* (2006.01)

(52) U.S. Cl.
USPC ............................ 370/331; 370/328; 370/394

(58) Field of Classification Search
USPC .................................................. 370/252, 331
See application file for complete search history.

(56) References Cited

U.S. PATENT DOCUMENTS

| | | | |
|---|---|---|---|
| 7,436,796 B2 * | 10/2008 | Takeuchi et al. | 370/328 |
| 7,539,759 B2 | 5/2009 | Narayanan et al. | |
| 7,590,708 B2 | 9/2009 | Hsu | |
| 7,889,097 B1 * | 2/2011 | Arnold et al. | 340/907 |
| 8,325,673 B1 * | 12/2012 | McQuaide, Jr. | 370/331 |
| 2003/0174667 A1 | 9/2003 | Krishnamurthi et al. | |
| 2005/0286470 A1 | 12/2005 | Asthana et al. | |
| 2006/0120326 A1 | 6/2006 | Takeuchi et al. | |
| 2006/0233135 A1 | 10/2006 | Oswal et al. | |
| 2007/0110009 A1 | 5/2007 | Bachmann et al. | |
| 2009/0144811 A1 | 6/2009 | Matsubara et al. | |
| 2010/0085947 A1 | 4/2010 | Ringland et al. | |
| 2010/0128694 A1 | 5/2010 | Choi-Grogan | |
| 2010/0177735 A1 | 7/2010 | Bihannic et al. | |

OTHER PUBLICATIONS www.cisco.com/en/US/docs/video/cda/is/2_0/configuration.guide/is_cds_2_0_2_3config.pdf, Cisco Internet Streamer CDS 2.0-2.3 Software Configuration Guide, Oct. 2008, 392 pages.
OA dated Sep. 2, 2011 for U.S. Appl. No. 12/277,063, 23 pages.
OA dated Feb. 17, 2012 for U.S. Appl. No. 12/277,063, 20 pages.

* cited by examiner

*Primary Examiner* — Warner Wong
(74) *Attorney, Agent, or Firm* — Amin, Turocy & Watson, LLP

(57) ABSTRACT

A user is enabled to seamlessly switch between networks and/or devices, during a content delivery session. A network change detection component can determine when the user switches from one network to another. Further, a context management component is employed that stores a context state of the content delivery session on the first network when a change in network is detected. The context state is employed to seamlessly resume content delivery on the newly connected network and continue the content delivery session.

20 Claims, 16 Drawing Sheets

CELL-TO-WIFI SWITCHER

CROSS-REFERENCE TO RELATED APPLICATIONS

This patent application is a continuation of U.S. patent application Ser. No. 12/277,063, filed on Nov. 24, 2008, entitled "CELL-TO-WIFI SWITCHER," the entirety which is incorporated herein by reference.

TECHNICAL FIELD

The subject innovation relates to wireless communications and, more particularly, to seamlessly switching between cellular and WiFi networks during mobile content delivery.

BACKGROUND

Advances in wireless telecommunications are rapidly increasing the use cellular phones to handle communication of media and data between users and providers. Typically, cellular phones have connected to mobile networks, such as a wireless wide area network (WWAN) employing a wireless connection (e.g. 2G/3G/3.5G/4G). Further advances in technology have enabled cellular phones to connect to multiple networks, for example, WiFi (wireless fidelity) networks and/or Bluetooth® networks.

Typically, WiFi enabled cellular phones can connect to a cellular network or a WiFi network when the cellular phone is in the coverage area of the respective network. By employing these WiFi enabled cellular phones, users can leverage a wireless access points to access the Internet, an intranet and/or enterprise, and download information. WiFi access points are becoming increasingly common and have a significantly higher data rate than the data part of cellular wireless technologies (e.g. GSM, CDMA, etc.) supported by mobile carriers. Further, WiFi enabled cellular phones can employ VoIP when connected to a WiFi network, to enable users to utilize the Internet to make phone calls, potentially saving the users' money and/or mobile minutes. Thus, users can employ a dual-mode (or multi-mode) handset, such as a WiFi enabled cellular phone, utilize WiFi communication when in WiFi network and utilize cellular communication when a WiFi network is not available.

Media Content is a significant and growing portion of wireless network traffic. Content owners/aggregators choose the largest "operator independent" distributors because of reach and simplicity of interface. Startups leverage smart edge devices to build peer to peer CDNs (Content delivery networks) that lack information to efficiently employ a network infrastructure. However, the aforementioned approaches can be costly and can introduce security and privacy issues.

DETAILED DESCRIPTION

Figure 1:
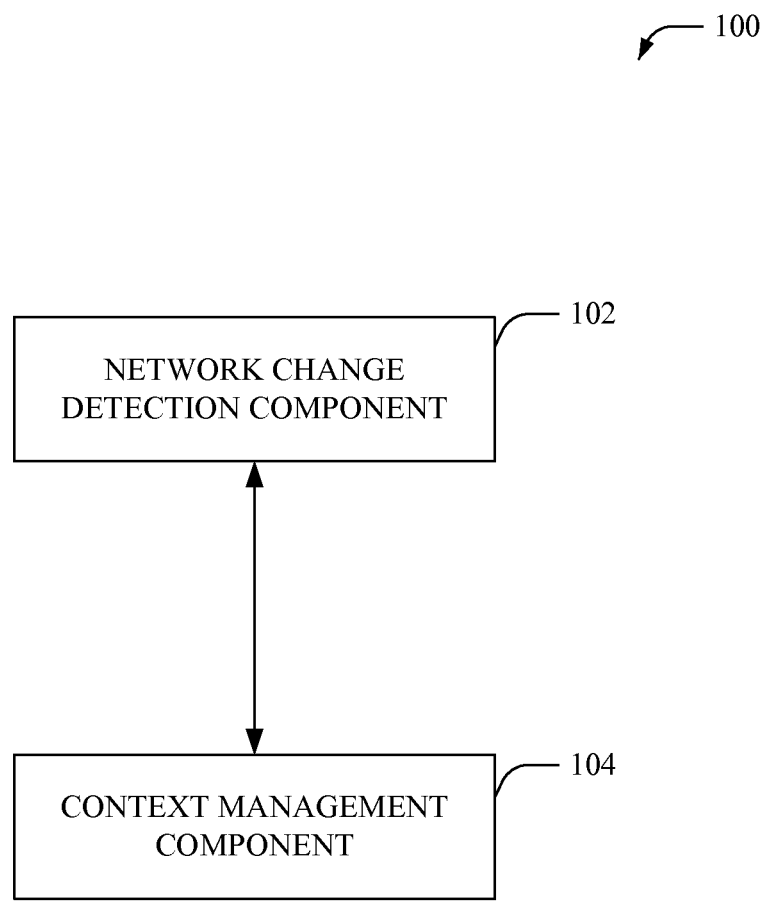
FIG. 1 illustrates an example system that can facilitate content delivery to a user by seamlessly switching between two or more networks, according to an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). The terms "mobile device", "portable device", "device" are used interchangeably herein and are intended to refer to most any portable electronic device such as, but not limited to a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem, a media player, a media recorder, a camera, etc., or a combination thereof.

Conventional mobile systems facilitate the delivery of mobile content, such as, video, audio, image, text, HTML, rich media objects, etc., to cellular phone users via a cellular network. Most often, content, including ringtone and/or wallpapers, can be delivered to a mobile user via SMS (Short Message Service) messages. Typically, a content delivery network (CDN) can be employed to deliver content more efficiently to users. The CDN can be a collection of servers (e.g. web servers, application servers, media servers etc.) distributed across multiple locations, wherein a server selected for delivering content to a specific user is typically based on a measure of network proximity Accordingly, a server with the fewest network hops or a server with the quickest response time can be chosen to deliver the requested content.

Systems and/or methods are presented herein that can seamlessly switch between networks supported by a mobile device while delivering content to the mobile device. In one aspect, a user can switch between cellular and WiFi (Wireless Fidelity) networks and experience no discontinuity but quality of content changes for some content types. In particular, when a network switch takes place, the mobile device typically connects to a new server over the new network. The systems and methods disclosed herein provide restoration of the context needs of the server application on the new server. Moreover, the exemplary systems and methods disclosed herein enable a user to receive requested mobile content through any network while employing a device that has a connection to multiple networks, for example, a multi-mode handset.

The systems and methods disclosed herein, in one aspect thereof, can enable a user to switch between networks during mobile content delivery in a seamless and efficient manner. In particular, the system can save a user's current context state when a change is detected in the user's current network connection. The saved context state can be employed to restore the content delivery session when the user switches to the new network. Thus, the system can deliver content requested by a user, through one of the networks supported by the device utilized by the user. Further, the system can also be employed to facilitate seamless content delivery when a user switches from one device to another.

In accordance with another aspect of the system, a network change detection component can monitor and determine a change in a user's network connection, after a request for content delivery is received from the user. In one aspect, the network change detection component can facilitate user registration by determining information associated with the user, such as, but not limited to, the user identity and/or handle. In addition, the network change detection component can monitor the user's network status and determine when a user switches to another network. Typically, when a user registers with a new network, the network change detection component can determine that a user has switched to a new network.

Another aspect of the subject innovation comprises a context management component that can be employed to save the current context of the content delivery session associated with the user when determined that the user is changing to a new network. As an example, the context management component can store a point up to which content has been delivered to the user, or a point from which content delivery should be restarted on the new network. Typically, on switching to a new network, the user can request to download content over the newly connected network and the content can be delivered based on the context information provided by the context restoration component.

Still another aspect of the system comprises a registration manager that receives information from an end point, including but not limited to, a user-id, device-id, network data, device capabilities, application capabilities, etc. Further, the system includes a serving delivery function (SDF) component that can receive a request from the end point and subscribe to the registration manager. The SDF component can deliver the received content to the end point via an optimal/preferred delivery method. According to an aspect, when the end point switches to a new network, the end point can provide information associated with the switch between networks to the registration manager. The registration manager can accordingly notify the SDF component servicing the request associated with the end point regarding the change in network connection. On receiving the notification, the SDF component can stop delivering content to the end point, cancel its subscription with the registration manager and store a current context state in customer context database (CCD). The end point can then send a request for content delivery over the new network. Moreover, a disparate SDF component can respond to the request and can subscribe with the registration manager, retrieve information associated with the end point from the registration manager and lookup the CCD based on the retrieved information to determine a context state of the content delivery session associated with the request. Furthermore, the disparate SDF component can deliver content to the end point via an optimal/preferred delivery method and based on the context state information. The SDF can also detect that a user has paused a current content delivery session to switch the session to another device. Accordingly, the SDF can update context information associated with the content delivery session based on the point in time when the user paused the session. Further, a disparate SDF connected to the new device, can restore the saved context information and resume content delivery on the new device.

Yet another aspect of the disclosed subject matter relates to a method that can be employed to seamlessly and efficiently deliver content to a user during network switching. The method comprises receiving a request for content from a user connected to a first network and verifying the authorization of the request. Further, the method includes registering the authorized user and delivering content from a content provider to the authorized user. Additionally, an optimal/preferred method for content delivery can be dynamically determined and the content can be delivered to the user employing the optimal/preferred method. When a change in the user's network connection is detected, the subscription generated on the first network can be cancelled and a context state associated with the content delivery session can be stored. In one aspect, a notification can be sent to the user to request content delivery over a second network. When a request for content delivery is received via the second network, the authorization of the request can be verified and information associated with the request, such as, the stored context state can be retrieved and updated. According to an aspect, on updating the context state, the content delivery session can be reinitiated from a point where the delivery had stopped.

Referring initially to FIG. 1, illustrated is an example system 100 that can facilitate content delivery to a user by seamlessly switching between two or more networks, according to an aspect of the subject specification. Specifically, system 100 can be employed by most any mobile device that can connect to multiple networks. It can be appreciated that the mobile device can include most any portable electronic device such as, but not limited to, a cell phone, a personal digital assistant (PDA), a laptop, etc. System 100 can dynamically adapt content delivery based on client environment changes, such as, network switching.

Typically, the mobile device can connect to a network, for example, a cellular, WiFi or Bluetooth® network, when the device is within the network coverage area and can request for content to be delivered over the connected network. As an example, a user can employ a browser or other application on the mobile device to receive their personalized content immediately on the home screen. The content can include linear TV, video on demand (subscription, purchase and one time rental), audio, customized and/or personalized data feeds and/or user generated content and/or non-subscription content such as video/audio/data sharing websites, social networking sites and the like. Further, a user can create personal content via the mobile device's camera, personal digital camera or downloads content from another site and can store the content in a single storage facility for future access, sharing with friends or editing functions. This content can be received on the mobile device by establishing a content delivery session over the network.

System 100 can include a network change detection component 102 that can determine when the mobile device changes its connection from one network to another. Further, a context management component 104 can be employed to seamlessly resume content delivery on the newly connected network. The network change detection component 102 can determine a network that user is connected to, when a request for content delivery is received by the system 100. In one aspect, when a user sends a request for content delivery, for example, from an on-net and/or off-net content provider, the network change detection component 102 can determine information associated with the user, such as, but not limited to, the user identity and/or handle. The information can be stored during user registration when the user connects to a particular network. Further, the network change detection component 102 can monitor the content delivery session to detect any change in the user's registration. When the user connects to a different network, the user can indicate a change in connection by updating its registration, which can be detected by the network change detection component 102.

According to an aspect, the network change detection component 102 can indicate a determined change in user network to the context management component 104. The context management component 104 can be employed to save the current context of the content delivery session associated with the user. For example, the context management component 104 can store a point up to which content has been delivered to the user, such as, "5 files delivered". The system 100 can receive the user's request to download content over the newly connected network and the content can be delivered based on the context information provided by the context management component 104. According to an additional aspect, the network change detection component 102 can also determine when a user indicates a switch to a new device on the new network and the system can similarly resume content delivery to the new device.

As an example, a user registered with a cellular network can request for content delivery from one or more content providers. The network change detection component 102 can determine information associated with the user, such as a user-id, handle, etc., based in part on the user registration. Further, the network change detection component 102 can monitor the registration during the content delivery session to detect a change in the user's network. When the user enters a WiFi network, the user can connect to the WiFi network and download the content at a higher data rate and/or in a different format for higher quality (higher frames per sec, bigger size, etc.). Before switching to the WiFi network, the user can update the registration to indicate the switch. The network change detection component 102 can determine the change in network, based on which, the context management component 104 can save the current context of the content delivery. The system 100 can receive a request for content delivery from the user over newly connected WiFi network and the context management component 104 can provide the context data associated with the content delivery session, such that, content delivery can begin from where it left off. Thus, only the content that has not yet been delivered to the user can be delivered over the new network. Although this example indicates that a user switches from a cellular network to a WiFi network, it can be appreciated that the user can switch between most any networks.

According to an aspect, the context management component 104 can save a minimal amount of context data associated with a content delivery session, such that the session can be restored on a new network. Moreover, in one example, when a client switches from one network to another, the client does not store information associated with the content delivery session that can facilitate restoration of the session over the new network. For example, when the client is in process of receiving content that can be pushed from a server, a server application is the only entity that knows what additional information can be pushed to the client. In another example, when the client is viewing a playlist that is on the server side, such as most any server-side playlist, only the server application can be aware of the playlist and its current state. Thus, the server application employs the context management component 104 to save context information associated with the playlist including a current state, such that, the session can be restored on a new server that will be attached to the client after the network switch.

Figure 2:
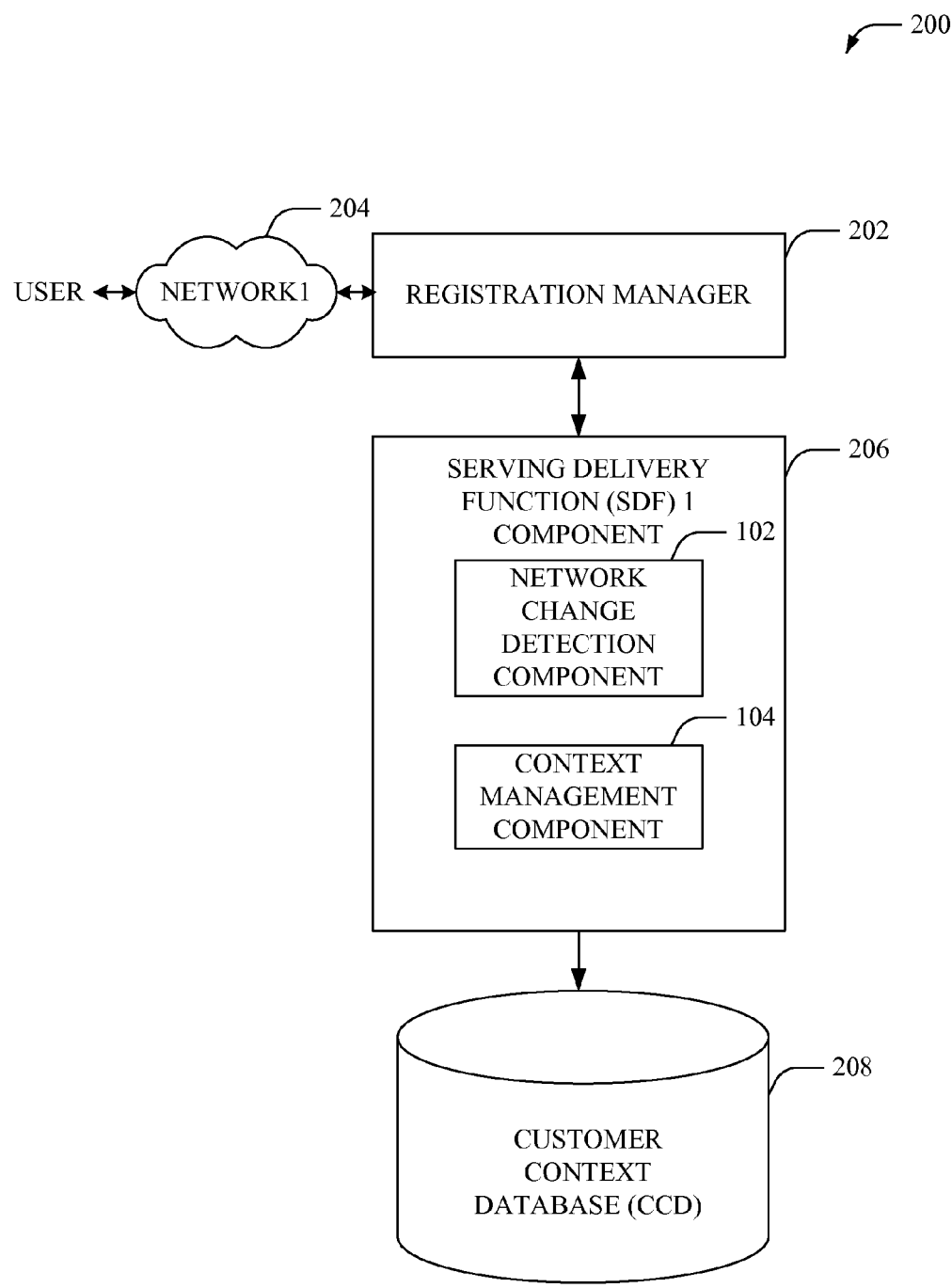
FIG. 2 illustrates an example system that can be employed to store a customer context state during content delivery in accordance with an aspect of the subject disclosure.

Referring now to FIG. 2, there illustrated is an example system 200 that can be employed to store a customer context state during content delivery in accordance with an aspect of the subject disclosure. The system 200 includes a registration manager 202 that can store data associated with a user connected to a network, for example, network1 204. In one example, the registration manager 202 can be a portal and/or an ecommerce system that can be managed by a third-party and can facilitate a billing process for content delivery. It can be appreciated that the user can be most any end point, such as, but not limited to a user device, premise device, gateway, etc. Further, the user can be capable of client functionality as described infra with respect to FIG. 9. Furthermore, the user can also include sufficient capability to act as a source of content. Additionally the user device can also act as an extended distribution device (e.g. MAG).

The user can connect to the network1 204 and request for content delivery over the network1 204. As an example, the network1 204 can be most any communication network, such as, but not limited to, a cellular network, WiFi network and/or Bluetooth® network. According to an aspect, content can be delivered from on-net and off-net content providers to on-net and off-net users. Typically, on-net users can be DSL and/or wireless customers, and off-net users can be on-net customers that are roaming, and/or customers on other networks that consume service provider carried content. Further, on-net content can include content that is hosted by the service provider, or content whose origin servers' access is provided or managed by the service provider's network. Furthermore, off-net content is content that is hosted by a third party for service provider services, such as, but not limited to content that is not hosted or promoted by the service provider (e.g. content aggregators).

The registration manager 202 can store data, associated with each user employing the system 200, which comprises user registration data. For example, the registration manager 202 can store a unique user-id associated with the user, one or more handles, data associated with the network1 204, etc. Further, the system 100 can include one or more serving delivery function (SDF) components, for example SDF1 component 206 that can be employed to deliver content to the user. According to an aspect, registration manager 202 can store information associated with the SDF1 component 206 that is employed by the user to receive content. The registration manager 202 can include a data store (not shown) to save the received information and subscriptions. Specifically, the SDF1 component 206 can receive a content delivery request from the user. It can be appreciated that content can include video, audio, image, text, HTML, rich media objects (XML and other static files—software, etc.) and can be delivered in real-time, near real time, progressive download, download, push/preload and the like.

According to an aspect, the SDF1 component 206, can also determine a delivery method for the content based in part on the delivery type. For example, unicast, multicast, broadcast, p2p etc. delivery methods can be employed by the SDF1 component 206 for different delivery types, such as, but not limited to, download, push/preload, streaming etc. Further, the SDF1 component 206 can also account for end device capabilities, for example, CPU, screen size, memory and accordingly adapt and/or modify the delivered content. Furthermore, the SDF1 component 206 can adapt and/or modify the delivered content based in part on network conditions. In addition the SDF1 component 206 can deliver content for different content types and/or applications to meet customer expectations (delays, packet loss, etc.), and the requirements of the application and/or protocol. It can be appreciated that the SDF1 component 206 can support very small to very large content sizes with appropriate delivery technology.

The SDF1 component 206 further comprises a network change detection component 102 that can determine a change in the user's current network. When the user intends to switch to another network, the user can notify the registration manager 202 regarding the change in network. Moreover, the registration manager 202 can update and/or modify the data associated with the user based on the change in network. Further, the registration manager 202 can inform the appropriate network change detection component 102 of the notification. According to an aspect, when the user switches to a disparate network (e.g. from a cellular network to a WiFi network) the SDF1 component 206 can cancel its subscription to the registration manager 202 and can stop delivering content via the old network 204. Further, the context management component 104 can store the current context state to a customer context database (CCD) 208. It can be appreciated that the network change detection component 102 and the context management component 104 can include functionality, as more fully described herein, for example, with regard to system 100.

The CCD 208 stores the context state, which can include, for example, data associated with the content at a point in time (e.g. video frames up to 30.25 minutes) that has been delivered to the user. It can be appreciated that the context state can include most any data associated with the state of the content delivery session when the session is cancelled. Additionally, the CCD 208 can also store a session-id and/or a user-id associated with the context state that can be employed to facilitate a lookup at a later time. According to an aspect, the saved context state can be utilized by a disparate SDF component that can be employed to deliver content over the new network.

Figure 3:
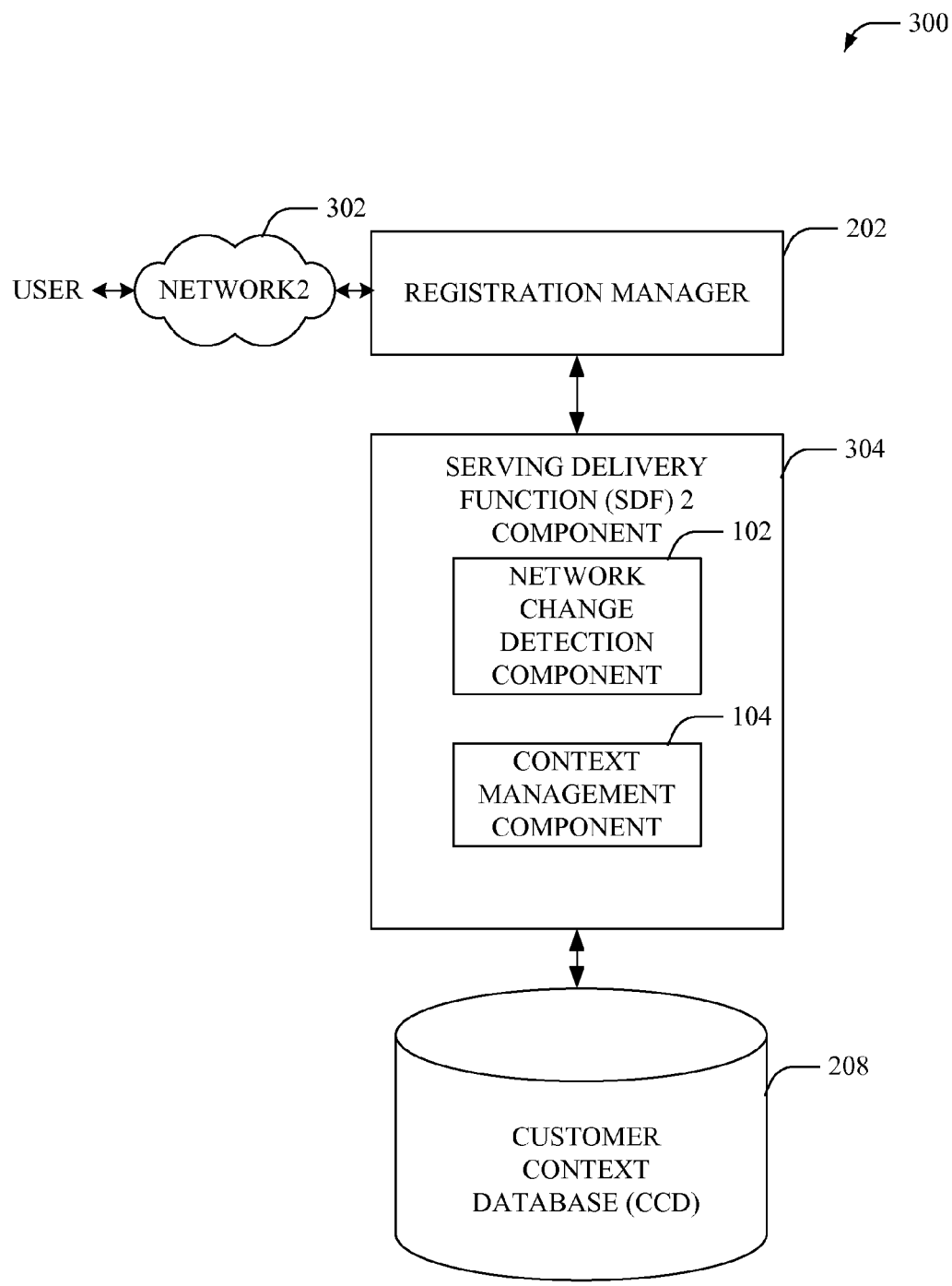
FIG. 3 illustrates an example system that can be employed to restore a customer context state during content delivery, according to an aspect of the subject disclosure.

FIG. 3 illustrates an example system 300 that can be employed to restore a customer context state during content delivery, according to an aspect of the subject disclosure. Specifically, the system 300 can enable a user to seamlessly switch to a new network, for example network2 302 during content delivery. It can be appreciated that the network change detection component 102, context management component 104, registration manager 202 and customer context database 208 can include functionality, as more fully described herein, for example, with regard to systems 100 and 200.

According to an embodiment, the user is mobile and when the user enters the coverage area of network2 302, the user can decide to switch to the new network. For example, if a user is employing a dual-mode handset, such as a WiFi enabled cellular phone, and the user enters the coverage area of a WiFi network from a cellular network, the user handset can connect to the WiFi network and receive content over the WiFi network. On switching to the new network2 302, the user can register with the registration manager 202 through the network2 302. The registration manager 202 can store information associated with the user such as, but not limited to, user registration data, user-id associated with the user, a handle, and/or data associated with the network2 302.

The user can also send a request for content delivery over the network2 302. A SDF2 component 304 can receive the request and register with the registration manager 202 to service the request. In an aspect, the registration manager 202 can store information associated with the SDF2 component 304 that is employed by the user to receive content over the new network2 302. Before initiating the content delivery session, the SDF2 component 304 can receive information associated with the user, for example, user-id, from the registration manager 202 and utilize the received data to lookup the customer context database (CCD) 208. Moreover, the context management component 104 can retrieve a context state associated with the content delivery session from the CCD 208 and accordingly restore and/or update the current context state. Thus, the SDF2 component 304 can employ the current state and deliver content from a point where the content delivery had previously stopped. As an example, if the current state retrieved by the context management component 104 from the CCD 208 indicated that thirty minutes of the video (content) has been delivered to the user, the SDF2 component 304 can accordingly start delivering the video from the thirty first minute.

The SDF 2 component 304 can deliver content from on-net or off-net source to on-net and off-net users. Further, the SDF2 component 304 can employ one or more access networks efficiently to provide best in class customer experience. Furthermore, the SDF2 component 304 can transcode content on the fly before delivery. Additionally or alternately, the SDF2 component 304 can receive content transcoded by an external and/or remote system. It can be appreciated that, SDF2 component 304 can include functionality as described with respect to SDF1 component 206 in FIG. 2.

Figure 4:
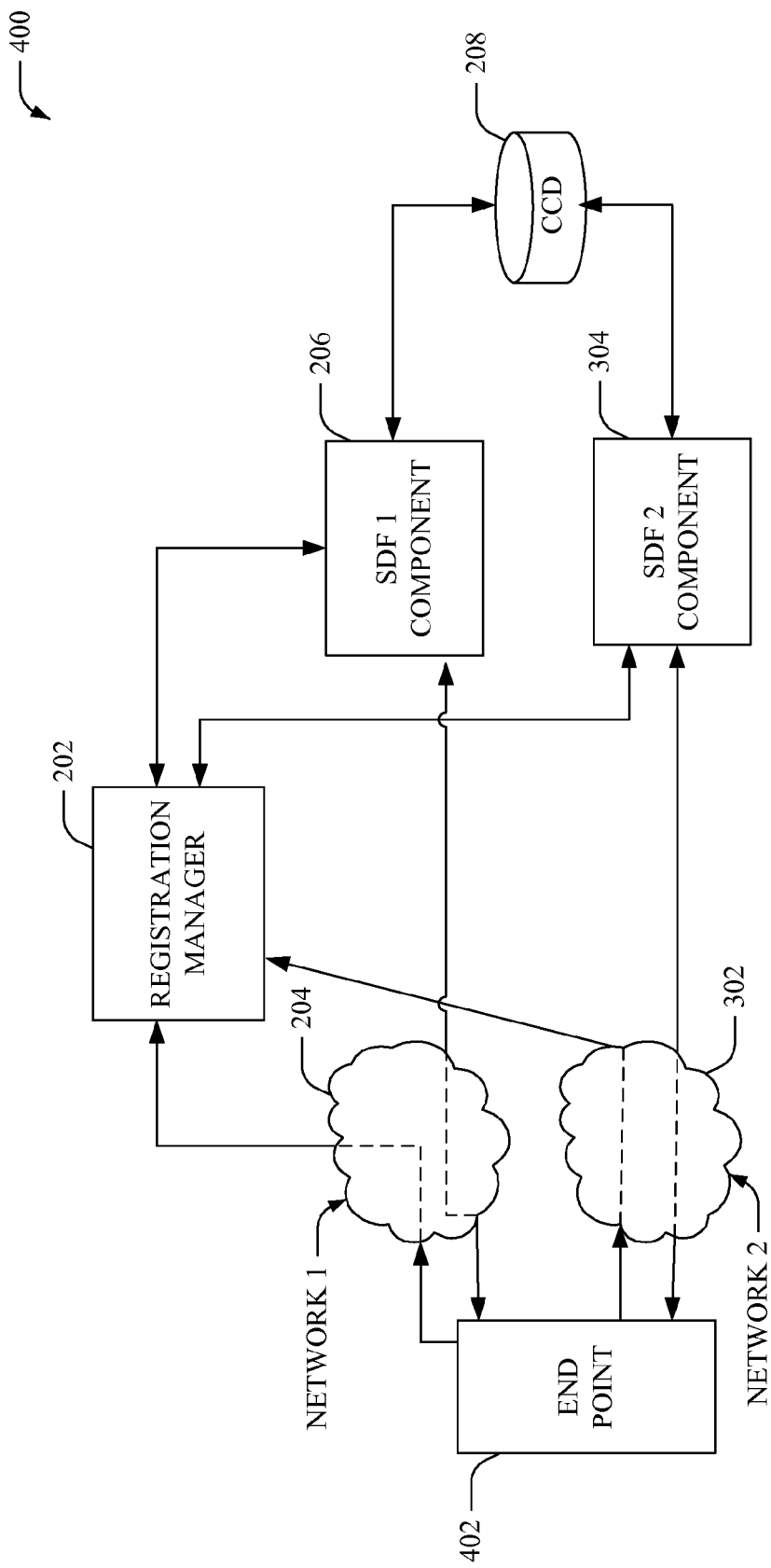
FIG. 4 illustrates is an example system that can be employed to seamlessly deliver content during a change in network connection in accordance with an aspect of the disclosure.

Referring to FIG. 4, there illustrated is an example system 400 that can be employed to seamlessly deliver content during a change in network connection in accordance with an aspect of the disclosure. The system 400 facilitates content delivery when a user switches from network1 (204) to network2 (302). As an example, network1 (204) and network2 (302) can include cellular networks, WiFi networks, Bluetooth® or Wireless broadband, for example WIMAX (Worldwide Interoperability for Microwave Access) networks. It can be appreciated that the registration manager 202, SDF1 component 206, SDF2 component 304 and customer context database 208 can include functionality, as more fully described herein, for example, with regard to systems 100, 200 and 300.

The system 400 can determine when an end point 402 switches between networks and accordingly can deliver content over the new network. The end point 402 can include, but is not limited to, user devices, for example, cellular phone, personal digital assistant (PDA), etc., premise devices, gateways, and the like. Further, the end point 402 can be employed by on-net and/or off-net users. Specifically, on-net users can be DSL and wireless customers, while off-net users can be on-net customers that are roaming, and/or customers on other networks that consume service provider carried content. Typically, business and/or consumer customers can be included.

The end point 402 can connect to a network1 (204), for example, a cellular network (e.g. GPRS/EDGE/CDMA/UMTS/HSPA/LTE/WiMAX). The end point 402 can register on the network1 (204) when connected, by providing the registration manager 202 with information associated the end point 402 and/or the network1 (204). The registration manager 202 can store the received information that can include a user-id, device-id, network data, etc. Further, the end point 402 can send a request for content to be delivered over the network1 (204). For example, the end point 402 can send a request to download a video from a content provider.

The request from the end point 402 can be serviced by an appropriate SDF component, for example, SDF1 component (206). On receiving a request for content delivery, the SDF1 component (206) can subscribe to the registration manager 202. In one aspect, the SDF1 component (206) can provide the registration manager 202 with information to indicate that it is servicing the request sent by end point 402. Further, the SDF1 component (206) can obtain metadata and/or the content if not locally available, for example, from the content provider, and can determine an optimal and/or preferred delivery method for content delivery. The SDF1 component (206) can deliver the obtained content to the end point 402 via the optimal and/or preferred delivery method.

When the end point 402 enters the coverage area of a network2 (302), the end point 402 can switch connection to the network2 (302). It can be appreciated that end point 402 can connect to multiple networks. For example, the network2 (302) can be a WiFi network and the end point 402 can connect to the WiFi network, such that it can download content at a higher data rate. According to an aspect, the end point 402 can provide information associated with the switch in networks to the registration manager 202. The registration manager 202 can determine that SDF1 component (206) is currently servicing a content delivery request for the end point 402 based on subscription information provided by SDF1 component (206). The registration manager 202 can then inform the SDF1 component (206) that the end point 402 has indicated a change in network. The SDF1 component (206) can stop delivering content to the end point 402 and cancel its subscription with the registration manager 202. Further, the SDF1 component (206) can store a current context state in the CCD 208. As an example, the current state can include information indicating the amount of content delivered to the end point 402 and/or the amount of content that has not yet been delivered to the end point 402, and/or an id, handle, authorization etc. associated with the end point 402. According to an aspect, after saving the current context state, the SDF1 component (206) can force the end point 402 to send a request for content delivery over the newly connected network (network2 302).

A disparate SDF component, for example, SDF2 component (302) can respond to the request sent by the end point 402 via network2 (302). It can be appreciated that in one example, the SDF1 component 206 can also be employed to respond to the request sent by the endpoint 402 via network2 (302), such that the SDF1 component 206 can perform acts substantially similar to those described infra with respect to SDF2 component (302). According to an aspect, the SDF2 component (302) can subscribe with the registration manager 202 and retrieve information associated with the end point 402, for example, user-id, handle, device-id, etc., from the registration manager 202. Further, the SDF2 component (302) can lookup the CCD 208 based on the retrieved information and determine a context state of the content delivery session associated with the request. Furthermore, the SDF2 component (302) can determine an optimal and/or preferred delivery method to deliver content from the content provider (not shown) to the end point 402. The SDF2 component (302) can deliver content to the end point 402 via the optimal and/or preferred delivery method based on the context state information. For example, if the context state indicated that 256 bytes of the content has already been delivered over the previous network, the SDF2 component (302) can start delivery from $257^{th}$ byte of content.

It can be appreciated that the SDF1 component (206) can include the functionality of the SDF2 component (302) and vice versa. For example, if the end point 402 were to switch back to network1 (204), the SDF2 component (302) could perform the functions described supra with respect to SDF1 component (206) and SDF1 component (206) could the functions described supra with respect to SDF2 component (302).

Figure 5:
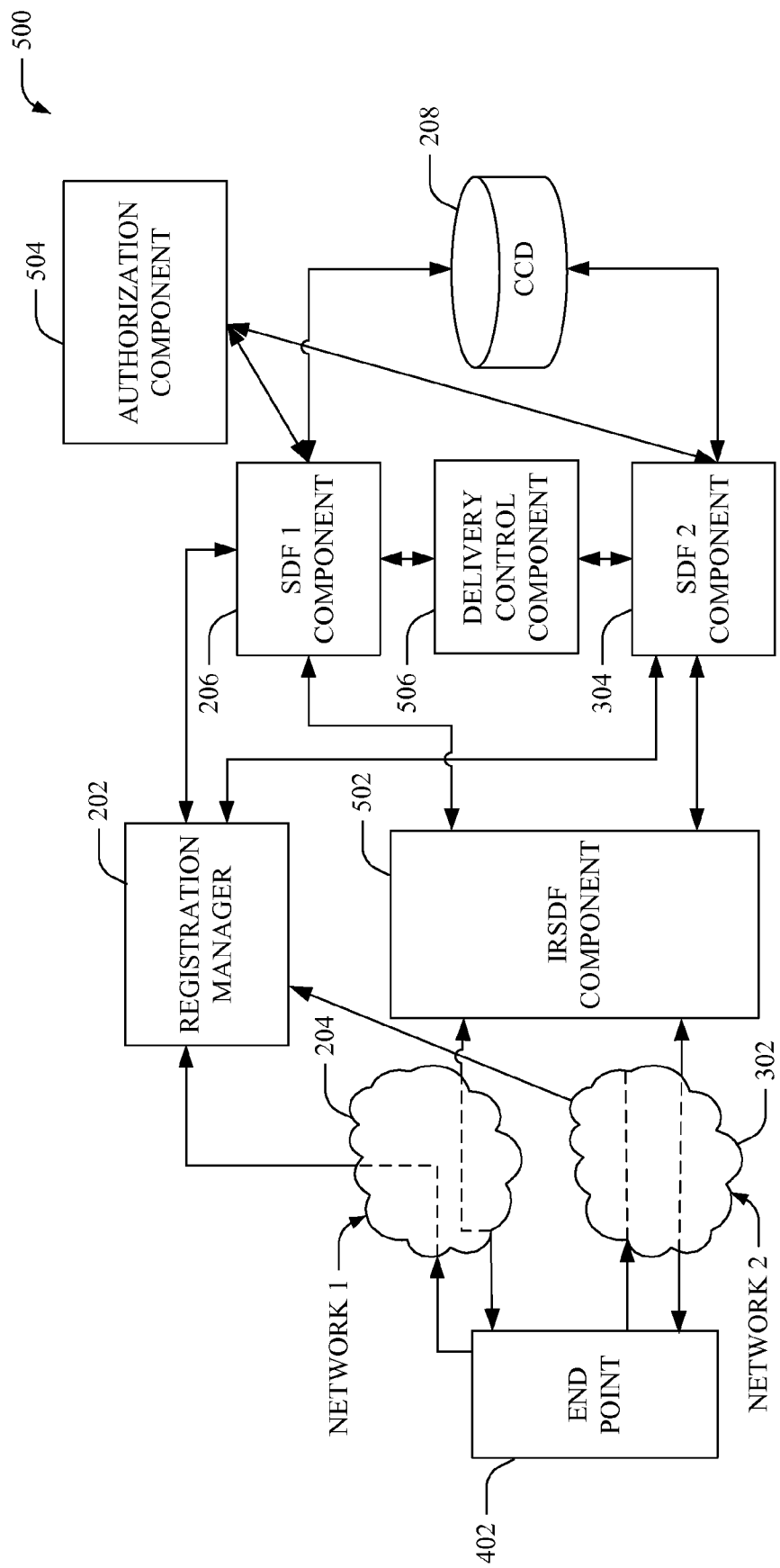
FIG. 5 illustrates an example system that can be employed to optimize and secure content delivery during a change in network connection in accordance with the subject innovation.

FIG. 5 illustrates an example system 500 that can be employed to optimize and secure content delivery during a change in network connection in accordance with the subject innovation. The system 500 facilitates content delivery via an optimal and/or preferred delivery method to an authorized end point 402 and seamlessly continues the delivery when the end point 402 switches from network1 (204) to network2 (302). It can be appreciated that the registration manager 202, SDF1 component 206, SDF2 component 304, customer context database 208, and end point 402 can include functionality, as more fully described herein, for example, with regard to systems 100, 200, 300 and 400. Further, networks 204, 302 can be most any network that the end point 402 can connect with, such as, but not limited to, a cellular network, a WiFi network, a Bluetooth® network, etc. Furthermore, although only two SDF components (SDF1 component and SDF2 component) are depicted in the figure, it can be appreciated that one or more SDFs can be connected to each network.

The system 500 can typically include an Intelligent Routing to Serving Delivery Function (IRSDF) component 502 that can be employed to make an informed decision and perform intelligent routing of a content delivery request from end point 402. Specifically, the IRSDF component 502 can determine an optimal/preferred content delivery serving element (e.g. SDF component) and route request to an optimal/preferred SDF that can serve the end point 402. In one example, an optimal/preferred SDF can be determined based in part on the distance between the end point 402 and the SDF. In another example, the IRSDF component 502 can determine an optimal/preferred SDF based on the amount of content to be delivered, features of the SDF, network parameters and/or a combination thereof. Once the optimal/preferred SDF is determined, the IRSDF component 502 can facilitate routing of the content delivery request from the end point 402 to the selected SDF. As an example, the optimal/preferred SDFs selected by the IRSDF component 502 are depicted in FIG. 5, as SDF1 component (206) on network1 (204), and SDF2 component (304) on network2 (302).

According to an aspect, the end point 402 can register with the registration manager 202 and send a request for content delivery from a content provider over the currently connected network1 (204). The IRSDF component 502 can receive this request and intelligently route the request to SDF1 component (206). On receiving the request, the SDF1 component (206) can subscribe to the registration manager 202. Further, the SDF1 component (206) can also receive information from an authorization component 504 to verify the authentication of the end point 402. According to an aspect, the authorization component 505 can employ most any identification and/or verification technique to authorize the content delivery request. In one example, the authorization component 504 can apply location based restrictions, parental control, security, etc. to the request received by the SDF1 component (206) based in part on user-defined settings, location of the end point 402, time of request, content provider defined parameters, etc. When the authorization component 504 determines that the request is unauthorized, the SDF1 component (206) does not deliver content to the end point 402. Additionally or optionally, the SDF1 component (206) can cancel subscription with the registration manager 202 and can inform the end point 402 that the request is not authorized and that the content delivery session has failed.

When the authorization component 504 determines that the request sent by the end point 402 is authorized, the SDF1 component (206) can initiate a content delivery session. The SDF1 component (206) can check the CCD 208 to determine if there is a context state associated with the request and accordingly begin content delivery. In addition, the SDF1 component (206) can receive data from a delivery control component 506 to determine an optimal and/or preferred method for content delivery. According to an aspect, the delivery control component 506 can position content for a preferred way to deliver, for example, unicast, multicast, P2P, all methods, etc. Further, the delivery control component 506 can handle preloading and/or scheduling of content. Moreover, the delivery control component 506 can dynamically determine an optimal and/or preferred method for SDF and/or portals for a particular content delivery session. Based on the information determined by the delivery control component 506, the SDF1 component (206) can employ the optimal and/or preferred delivery method to deliver content to the end point 402.

According to an aspect, when the end point 402 decides to switch from network1 (204) to network2 (302), the end point 402 registers with the registration manager 202 via network2 (302). As an example, the end point 402 can switch networks to achieve a higher data rate of the new network or can switch networks based on the received signal strength of the available networks. The registration manager 202 can indicate the network switch to the currently subscribed SDF associated with the end point 402, for example, SDF1 component (206). The SDF1 component (206) can then cancel its subscription from the registration manager 202 and update the CCD 208 with the current context state of the content delivery session. Further, the SDF1 component (206) can force the end point 402 to send a request to the IRSDF component 502 over the network2 (302).

The IRSDF component 502 can determine the optimal and/or preferred SDF component that can service the request on network2 (302), for example SDF2 component (304), and route the request to SDF2 component (304). The SDF2 component (304) can receive the content delivery request and subscribe to the registration manager 202. Further, the SDF2 component (304) can retrieve information, for example, handle and state from the registration manager 202 and the CCD 208, and accordingly update the content delivery session. Additionally, the SDF2 component (304) can determine if the content delivery session is authorized based on information from the authorization component 504. For an authorized session, the SDF2 component (304) can receive information from the delivery control component 506 that can determine an optimal and/or preferred delivery method. The SDF2 component (304) can deliver the remaining content to the end point 402 based on the context state, via the optimal and/or preferred delivery method.

In one example, the end point 402 can have limited or no capability to store authentication and/or authorization information, such as, but not limited to, a token in a cookie, and/or content transfer information. Moreover, the end point 402 can store limited information in a cookie mechanism, such as a session random number. This number can be employed on the server side, for example, by the SDF2 component (304) along with an authentication id to restore appropriate context (authorization for content, and/or other state information for the server side application like a time stamp that indicates when the end point 402 started downloading content, even though the present content may have changed or being restricted) from an appropriate client application.

It can be appreciated that the CCD 208 described herein can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g. data stores, databases) of the subject systems and methods is intended to comprise, without being limited to, these and any other suitable types of memory.

Figure 6:
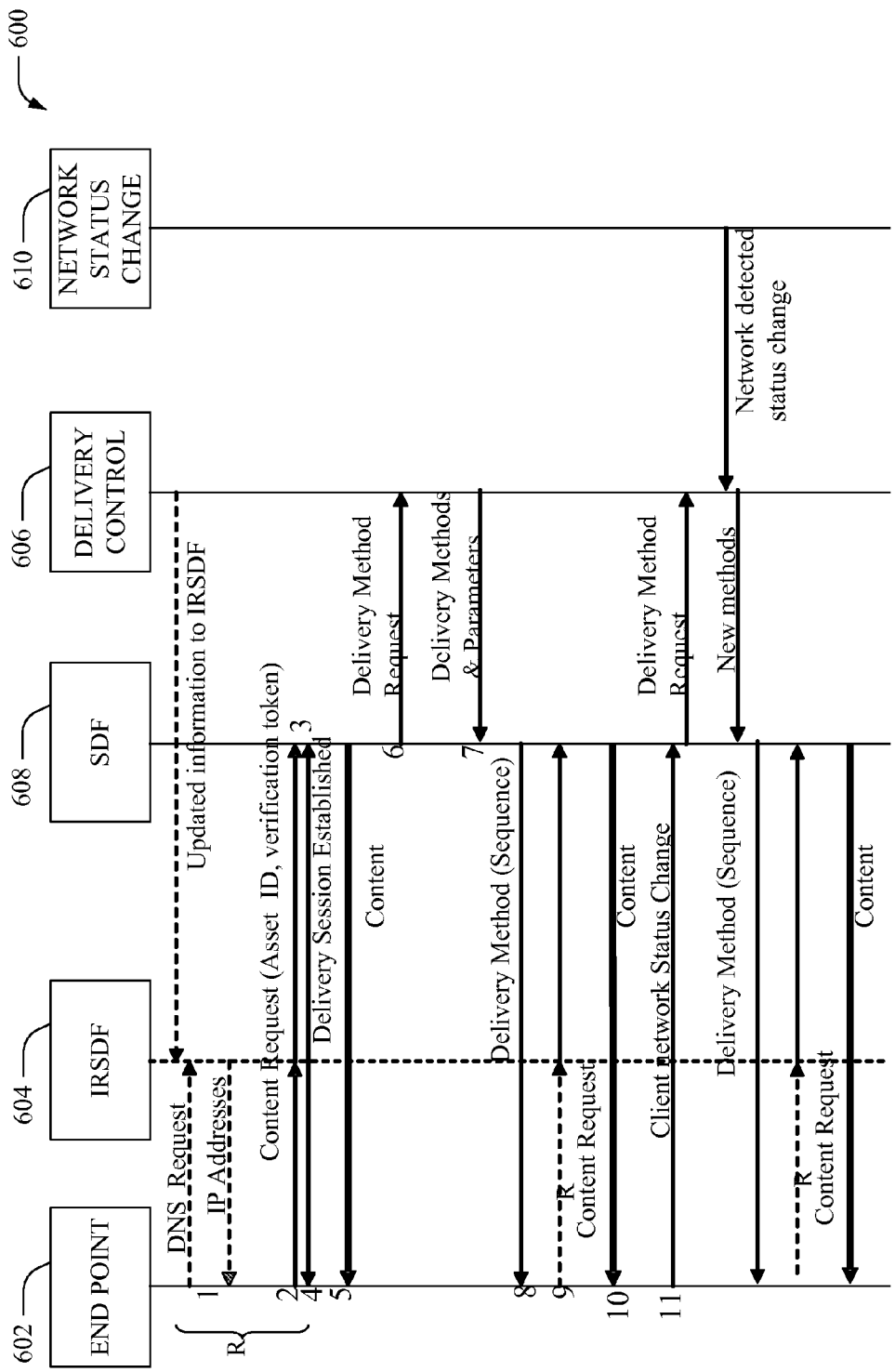
FIG. 6 illustrates an example flow diagram that can establish a content delivery session and deliver content to an end point during network switching, according to an aspect of the subject innovation.

Referring now to FIG. 6, there illustrated is an example flow diagram 600 that can establish a content delivery session and deliver content to an end point 602 during network switching, according to an aspect of the subject innovation. Specifically, the diagram 600 illustrates dynamic selection of a delivery method and adaptation to network changes during content delivery. More specifically, the diagram 600 illustrates a sequence wherein a content delivery session can be established, an efficient delivery method can be employed to deliver the content and the session can be adapted when a network change is detected.

As seen from the flow diagram 600, at step 1, a DNS (Domain Name System) request can be sent from the end point 602 to a IRSDF (Intelligent routing to serving delivery function) 604. Further, the delivery control 606 can send updated information, for example, information regarding network delivery options, to the IRSDF 604. The IRSDF 604 can return an appropriate IP (internet protocol) to the end point 602. At step 2, the end point 602 can send a request through the IRSDF along with an asset id and/or verification token that can be forwarded at step 3 to the SDF (serving delivery function) 608. In response to the request, the SDF 608 can establish a content delivery session as depicted at step 4. Further, at step 5, the SDF 608 can deliver the requested content to the end point 602.

At step 6, the SDF 608 can query the delivery control 606 regarding an optimal and/or preferred delivery method. The delivery control 606 can send delivery methods and/or parameters to the SDF 608 in response to the query, as shown at step 7. According to an aspect, the SDF 608 can send the delivery method information, for example, a sequence, to the end point 602 at step 8. Further, the end point 602 can register with the IRSDF 604 (as described in steps 1-2), request for a new IP address for a disparate SDF 608 from the IRSDF 604 and the content delivery request can be forwarded to the disparate SDF 608 at step 9. Furthermore, at step 10, the content can be delivered to the end point 602 by the SDF 608 by employing an optimal and/or preferred delivery method. At step 11, the end point 602 informs the SDF 608 of a client network status change. The SDF 608 can then query the delivery control 606 for a new delivery method. The delivery control 606 can be notified of the change in network status by a network status change. The delivery control can send new delivery methods to the SDF based on the network status change 610. Accordingly, the SDF 608 can deliver content to the end point 602 employing the new methods, similar to steps 8-10. Although not depicted as a step in FIG. 6, it can be appreciated that when the network is changed, the SDF 608 can be switched to a disparate SDF.

Figure 7:
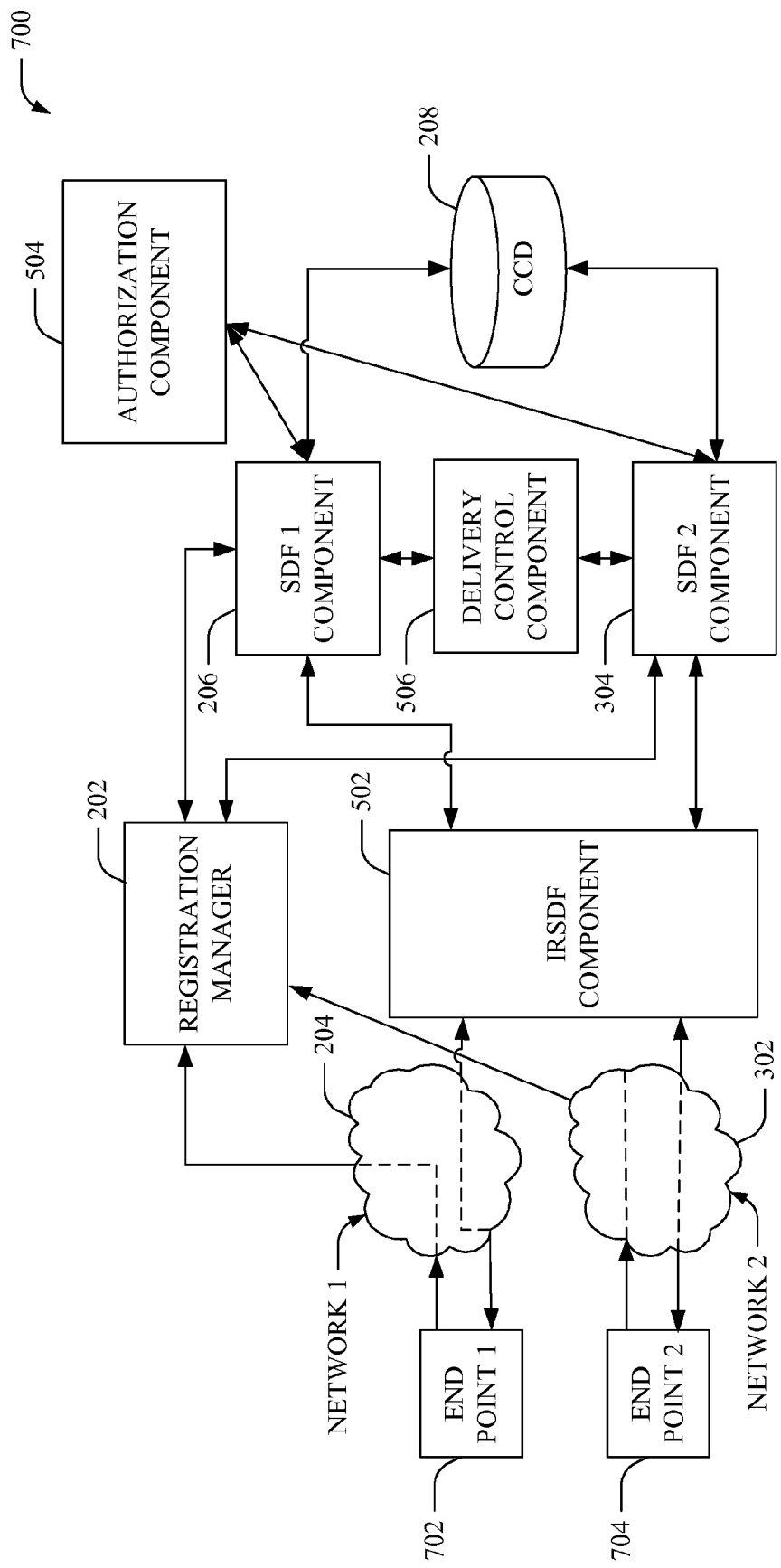
FIG. 7 illustrates an example system that can be employed to establish an uninterrupted content delivery session and deliver content to a user when the user switches from one end point to another in accordance with the subject innovation.

FIG. 7 illustrates an example system 700 that can be employed to establish an uninterrupted content delivery session and deliver content to a user when the user switches from end point1 702 to end point2 704 in accordance with the subject innovation. In particular, the system 700 facilitates content delivery via an optimal and/or preferred delivery method to an authorized end point1 702 and seamlessly continues the delivery when the user employing the end point1 702 switches to a new end point2 704. In one example, as shown in FIG. 7, the new end point 704 can connect via a new network 302. However, it can be appreciated that the system 700 can be employed when the user switches between devices connected to the same network (not shown). Further, it can be appreciated that the registration manager 202, SDF1 component 206, SDF2 component 304, customer context database 208, networks 204, 302, IRSDF component 502, authorization component 504, and delivery control component 506 can include functionality, as more fully described herein, for example, with regard to systems 100, 200, 300, 400 and 500. In addition, end points 702 and 704 can each be substantially similar to end point 402 that is described in detail with respect to system 400 and 500. Further, networks 204, 302 can be most any network that the end point 402 can connect with, such as, but not limited to, a cellular network, a WiFi network, a Bluetooth® network, etc. Furthermore, although only two SDF components (SDF1 component and SDF2 component) are depicted in the figure, it can be appreciated that one or more SDFs can be connected to each network.

According to an aspect, end points 702, 704 can include most any device employed by a user, such as but not limited to, a cellular phone, a personal digital assistant (PDA), etc., laptop, personal computer, media player, television, premise devices, gateways, and the like. In an example scenario, a user can establish a content delivery session and start downloading content to end point 1 702. System 700 enables the user to pause the content delivery session on end point1 702, switch to a new end point2 704, and seamlessly restore the content delivery session on the new end point2 704. For example, a user can establish a content delivery session to watch a video on a cell phone. Further, at any time after the session has been established, the user can pause the video from the cell phone and play the video from another device, for example, a laptop connected to a DSL (digital subscriber line). The system 700 enables the user to play the video on the laptop from a point where the user had paused the video on the cell phone.

In one aspect, the end point1 702 can register with the registration manager 202 and send a request for content delivery from a content provider over the currently connected network1 (204), as described supra with respect to systems 400 and 500. The IRSDF component 502 can receive this request and intelligently route the request to SDF1 component (206). On receiving the request, the SDF1 component (206) can subscribe to the registration manager 202. Further, the SDF1 component (206) can also receive information from an authorization component 504 to verify the authentication of the end point1 702. Furthermore, the SDF1 component (206) can store an initial context state associated with the content delivery session in a CCD 208. The initial context state can include information, such as, but not limited to, handle, user-id, device-id, etc. associated with the end point1 702. The SDF1 component (206) can accordingly initiate a content delivery session to end point1 702. In addition, the SDF1 component (206) can receive data from a delivery control component 506 to determine an optimal and/or preferred method for content delivery and can delivery the content via the determined method.

During content delivery, the user employing end point1 702 can pause the delivery session. It can be appreciated that the user can employ most any means to indicate a pause, such as but not limited to, pressing a pause button on the end point1 702. The SDF1 component (206) can receive the pause signal indicated by the user and accordingly stop the content delivery to the end point1 702. In one aspect, a signal substantially similar to the pause signal can be received by the SDF1 component (206), for example, when the endpoint1 702 is switched off, and/or a battery of the endpoint1 702 runs down and/or the endpoint1 702 hibernates, etc. Similarly, a failure message during communicating to the endpoint1 702 for variety of reasons including power-off, can also be treated as if a pause button is pressed. Accordingly, when one or more of the aforementioned signals are received, the SDF1 component (206) can store a current context state of the content delivery session in the CCD 208. As an example, the current state can include information indicating the amount of content delivered to the end point1 702 and/or the amount of content that has not yet been delivered to the end point1 702 when the pause signal was received. Furthermore, the SDF1 component (206) can cancel subscription with the registration manager 202 and notify the delivery control component 506 regarding the pause in content delivery.

According to an aspect, the user can switch to a new end point2 704, that can be connected to a new network2 302. The user can register with the registration manager 202 via the new end point2 704. In one example, the registration manager 202 can be a portal and the user can connect to the portal via end point2 704. The registration manager 202, in one example, can request a user-id and/or password from the user on the new device for registration. In another example, the registration manager 202 can automatically determine a user-id and/or password from end point2 704. The registration manager 202 can then correlate ids, lookup the CCD 208, and send a link to the end point2 704 that can provide data that facilitates restoration of the paused delivery session.

The end point2 704 can send a request for content delivery to the IRSDF component 502, which can determine an optimal/preferred SDF component that can service the request on network2 (302), for example, but not limited to, SDF2 component (304), and route the request to SDF2 component (304). It can be appreciated that the SDF1 component (206) can also be selected by the IRSDF component 502 to service the new request. The SDF2 component (304) can receive the content delivery request and subscribe to the registration manager 202. Further, the SDF2 component (304) can retrieve information, for example, handle and state from the registration manager 202 and the CCD 208, and accordingly update the content delivery session. Additionally, the SDF2 component (304) can verify authorization of the content delivery session is authorized based in part on information from the authorization component 504. For an authorized session, the SDF2 component (304) can deliver the remaining content to the end point2 704 based on the context state, via an optimal/preferred delivery method determined by the delivery control component 506. Moreover, the SDF2 component (304) starts delivery of content to the end point2 704 from a point where the delivery of content had been paused on end point1 702. Additionally, it can be appreciated that the format of the content delivered to the new end point2 704 can be customized (e.g. by the delivery control component 506) based on characteristics and/or preferences associated with the end point2 704, and/or the network 302. It can be appreciated that the IRSDF component 502, the authorization component 504 and/or the delivery control component 506 can be optional components that are employed by system 700 to optimize and/or secure the content delivery session during a change in device and/or network connection.

In one embodiment, system 700 can also be employed to restore content delivery during a communication failure. As an example, when a communication failure occurs between the SDF1 component (206) and the end point1 702 during a content delivery session, the SDF1 component (206) can store a current context state of the content delivery session in the CCD 208. In an aspect, the current state can include information indicating the amount of content delivered to the end point1 702 and/or the amount of content that has not yet been delivered to the end point1 702 when the communication failure occurred. Accordingly, when communication is restored, the SDF1 component (206) can restore the context state of the content delivery session and resume the session from a point where failure had occurred. It can be appreciated that the communication failure can be a result of various factors, such as, but not limited to, user tuning-off device, battery discharge, application failure, network failure, etc.

Figure 8:
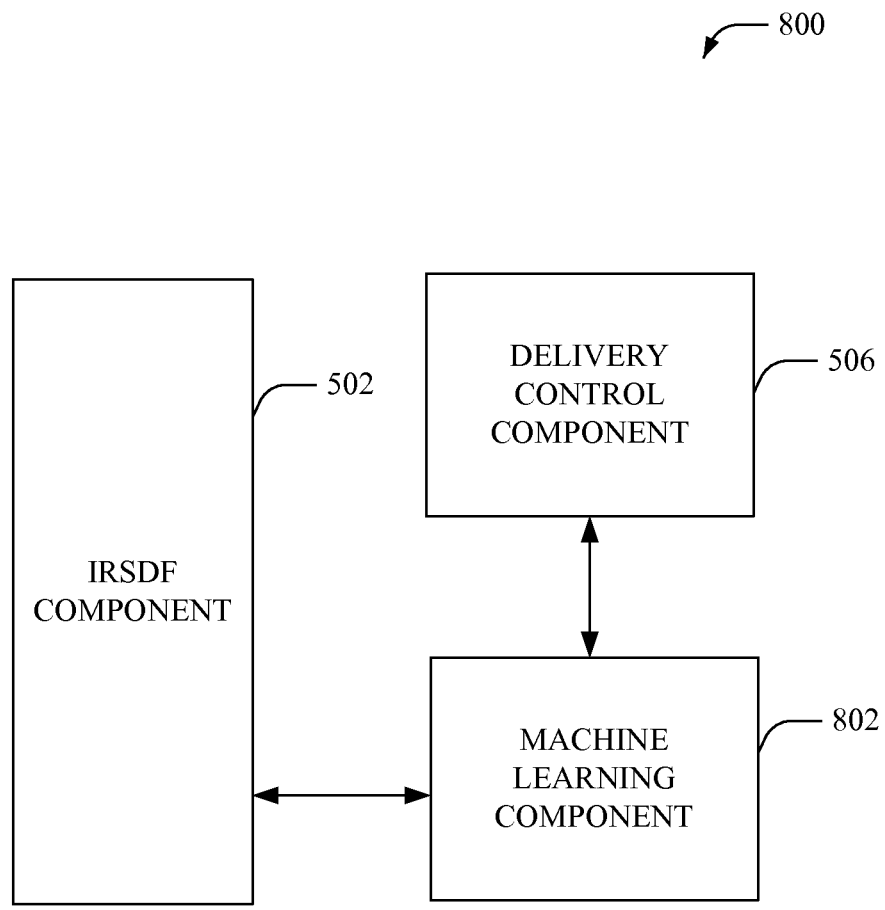
FIG. 8 illustrates an example system that facilitates automating one or more features in accordance with the subject innovation.

Referring to FIG. 8, there illustrated is an example system 800 that employs a machine learning component 802 to facilitate automating one or more features in accordance with the subject innovation. The subject innovation (e.g., in connection with SDF or delivery method selection) can employ various AI-based schemes for carrying out various aspects thereof. For example, a process for determining a method for content delivery can be facilitated via an automatic classifier system and process. Moreover, where the system has multiple delivery methods, the classifier can be employed to determine which method will be selected for delivering content to an end point. It can be appreciated that the IRSDF component 502 and the delivery control component 506 can each include their respective functionality, as more fully described herein, for example, with regard to system 500.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria the SDF selected by the IRSDF component 502, the delivery method selected by the delivery control component 506 etc. The criteria can include, but is not limited to, current network conditions, network bandwidth, current network traffic, the amount of content to be delivered, the location of the end device, the type of data, the importance of the data, predefined policies and/or rules etc. Although, only the IRSDF component 502 and the delivery control component 506 are depicted in the figure, it can be appreciated that the machine learning component 802 can be employed to automate most any feature of the subject innovation.

Figure 9:
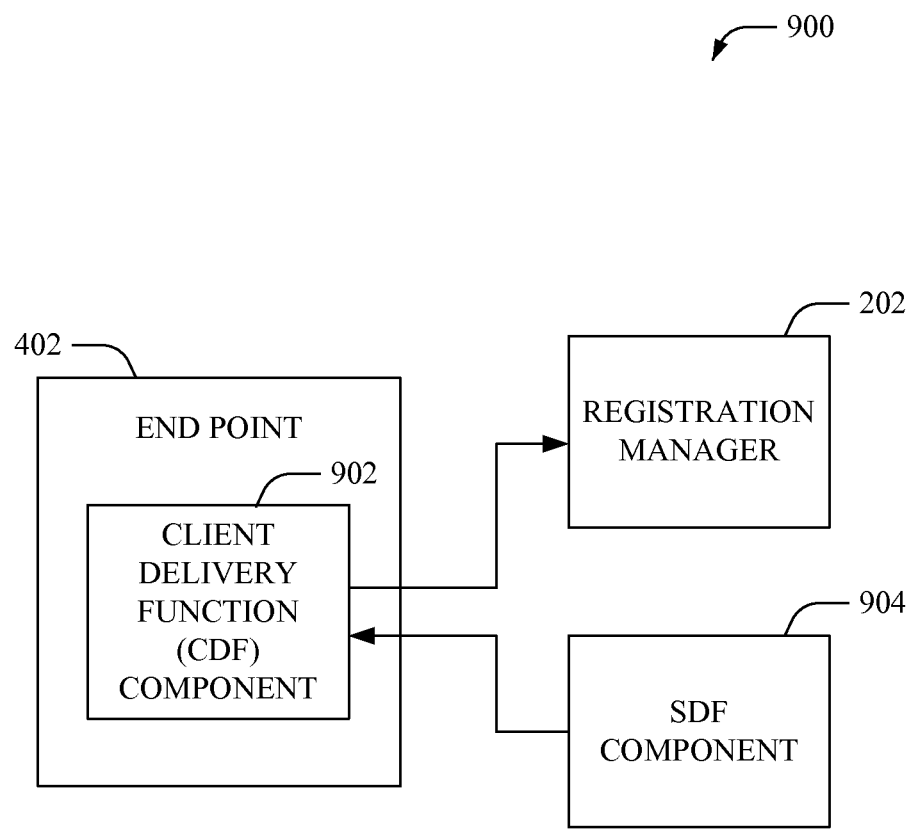
FIG. 9 illustrates an example system that can be employed to receive content over multiple networks in a seamless manner, according to an aspect of the subject specification.

FIG. 9 illustrates an example system 900 that can be employed to receive content over multiple networks in a seamless manner, according to an aspect of the subject specification. Typically, the system 900 includes an end point 402, such as, but not limited to a user device, premise device, gateway, etc. A user can employ the end point 402 to establish a content delivery session and receive content from a content provider at the end point 402. As an example, the end point 402 can be a PC (personal computer), mobile phone, laptop computer, and/or portable media player that can consume content on most any screen and from most any location and at most any time. According to an aspect, content delivery can be employed for electronic sell through of music for download to own and transfer across devices, electronic sell through of video for network storage and streaming to device, electronic sell through of video for download to burn on DVD, and/or download to rent video, rented video streamed to user, sharing of audio, video and/or data files, event-based customized information or web feed (e.g., stock updates) delivered instantaneously to an end point 402. Further, in another example, content can be downloaded onto a mobile device from a PC at home using an appropriate application.

The end point 402 can include a client delivery function (CDF) component 902 that can be employed to negotiate, switch and use best delivery methods to receive content. Initially, when the end point 402 is connected to a network (not shown), for example a cellular network or WiFi network, the CDF component 902 can be employed to register with the registration manager 202. The registration can include sending end point 402 related data, such as, but not limited to user-id, device-id, device capabilities, etc. Further, the CDF component 902 can initiate content delivery by sending a request to a SDF component 904 (or IRSDF component). The CDF component 902 can also store and supply security token to the SDF component 904 for authorization. Additionally or alternately, the CDF component 902 can negotiate with the SDF component 904 and determine optimal and/or preferred content delivery methods. Further, the CDF component 902 can receive content from the SDF component 904 via the optimal and/or preferred delivery method.

According to an aspect, the CDF component 902 can include a buffer (not shown) that can store the received content. The CDF component 902 can preload and manage content delivered by the SDF component 904. In one aspect, when the end point 402, switches to a new network during the content delivery, the CDF component 902 can update the registration in the registration manager 202 to indicate the change in network. The registration manager 202 can inform the SDF component 904 of the change in network and accordingly the SDF component 904 can store a current context state associated with the content delivery session.

Typically, the CDF component 902 can receive an indication from the SDF component 904 that forces the CDF component 902 to send a request for content delivery over the new network. Accordingly, the CDF component 902 can request for content over the new network and receive the remaining content. Typically, the CDF component 902 can store minimal and/or limited information associated with the content delivery session. Thus, the SDF component 904 can be employed to facilitate context management during a content delivery session, such that context can be efficiently restored (for example, by a disparate SDF component) when a user switches from one network to another (and/or end point to another). However, in one example, the CDF component 902 can also be employed to facilitate context management by storing data associated with the delivery session. It can be appreciated that the registration manager 202 can include functionality, as more fully described herein, for example, with regard to systems 200, 300, 400 and 500. Further, it can be appreciated that the SDF component 904 can include functionality, as more fully described herein, with respect to SDF1 component 206 and SDF2 component 304 in FIGS. 2, 3, 4 and 5.

Figure 10:
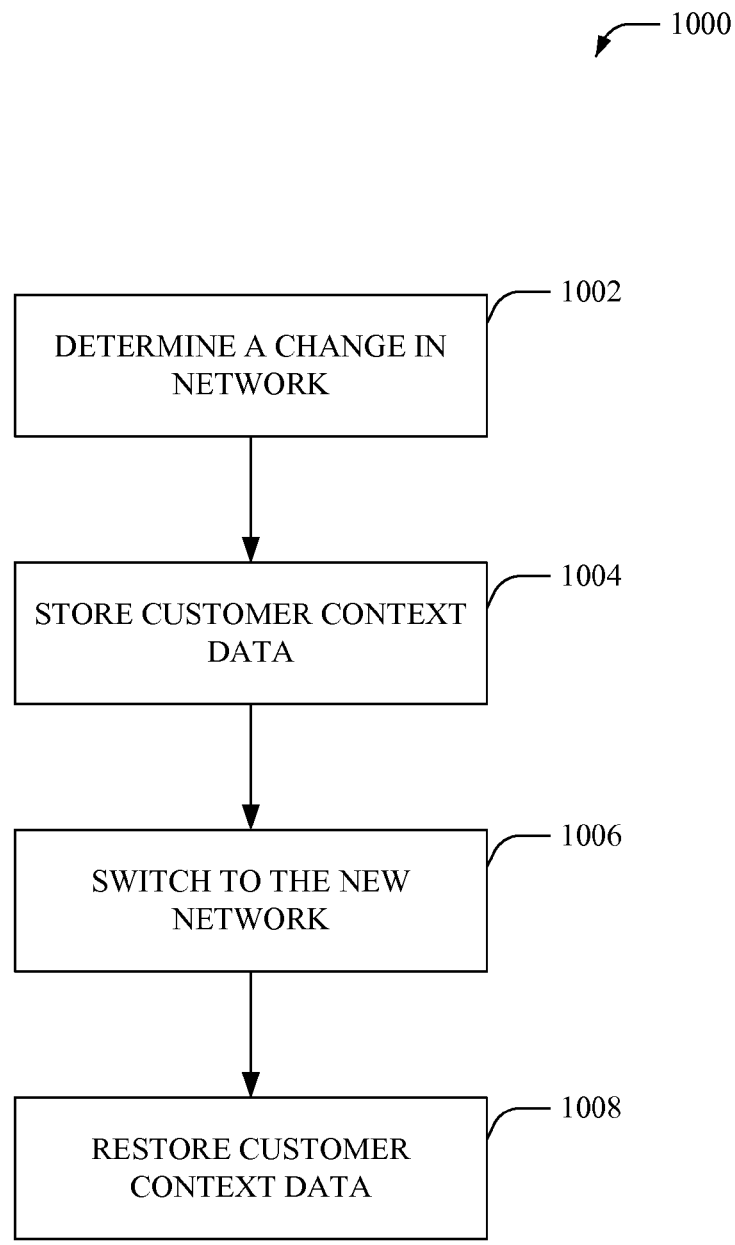
FIG. 10 illustrates an example methodology that can be employed to restore customer context data when the user switches to a new network during content delivery in accordance with an aspect of the subject disclosure.

FIGS. 10-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 10, illustrated is an example methodology 1000 that can be employed to restore customer context data when the user switches to a new network during content delivery in accordance with an aspect of the subject disclosure. Typically, the content delivered can include, but is not limited to, video, audio, image, text, HTML, rich media objects, etc. and a combination thereof. The content can be delivered in various delivery types (e.g. real-time, near real time, progressive download or download) and/or utilizing various delivery methods (e.g. wireless broadcast, multicast, unicast).

According to an aspect, a user can request for and receive content over a currently connected network. At 1002, a change in network during content delivery to a user is determined. At 1004, a customer context data is stored. The customer context data can include, but is not limited to, information associated with the current state of the content delivery session that indicates a point at which content delivery is stopped. At 1006, the user switches to the new network. The user can then send a request for the content over the new network. At 1008, the customer context data associated with the content delivery session can be restored. Accordingly, content can be delivered to the user from a point where it had previously stopped. Thus, re-delivery of the previously delivered content can be avoided and the remaining content can be delivered efficiently.

Figure 11A:
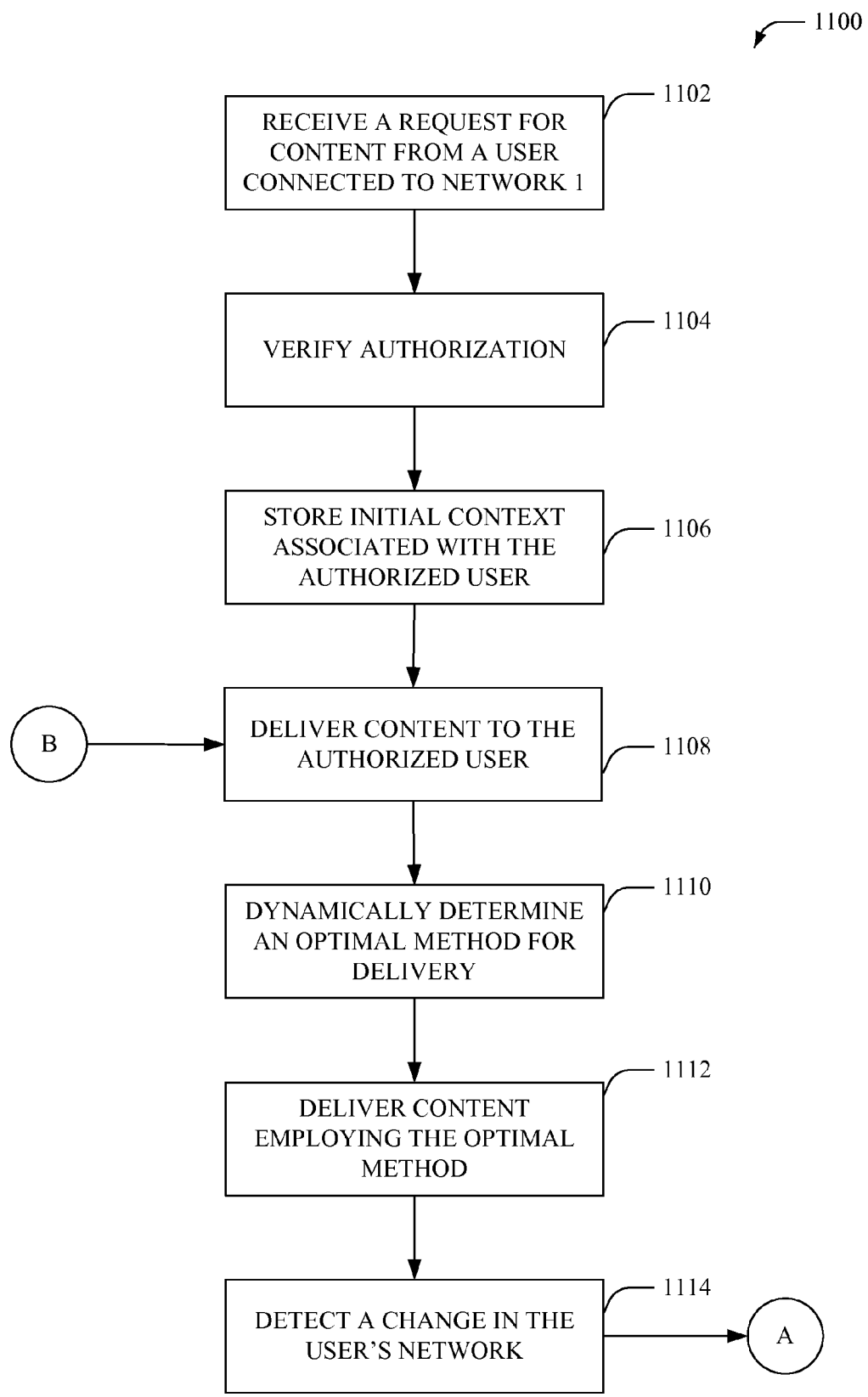
FIGS. 11A and 11B illustrate example methodologies that can be employed to seamlessly and efficiently deliver content during a change in network connection, according to an aspect of the disclosed subject innovation.
Figure 11B:
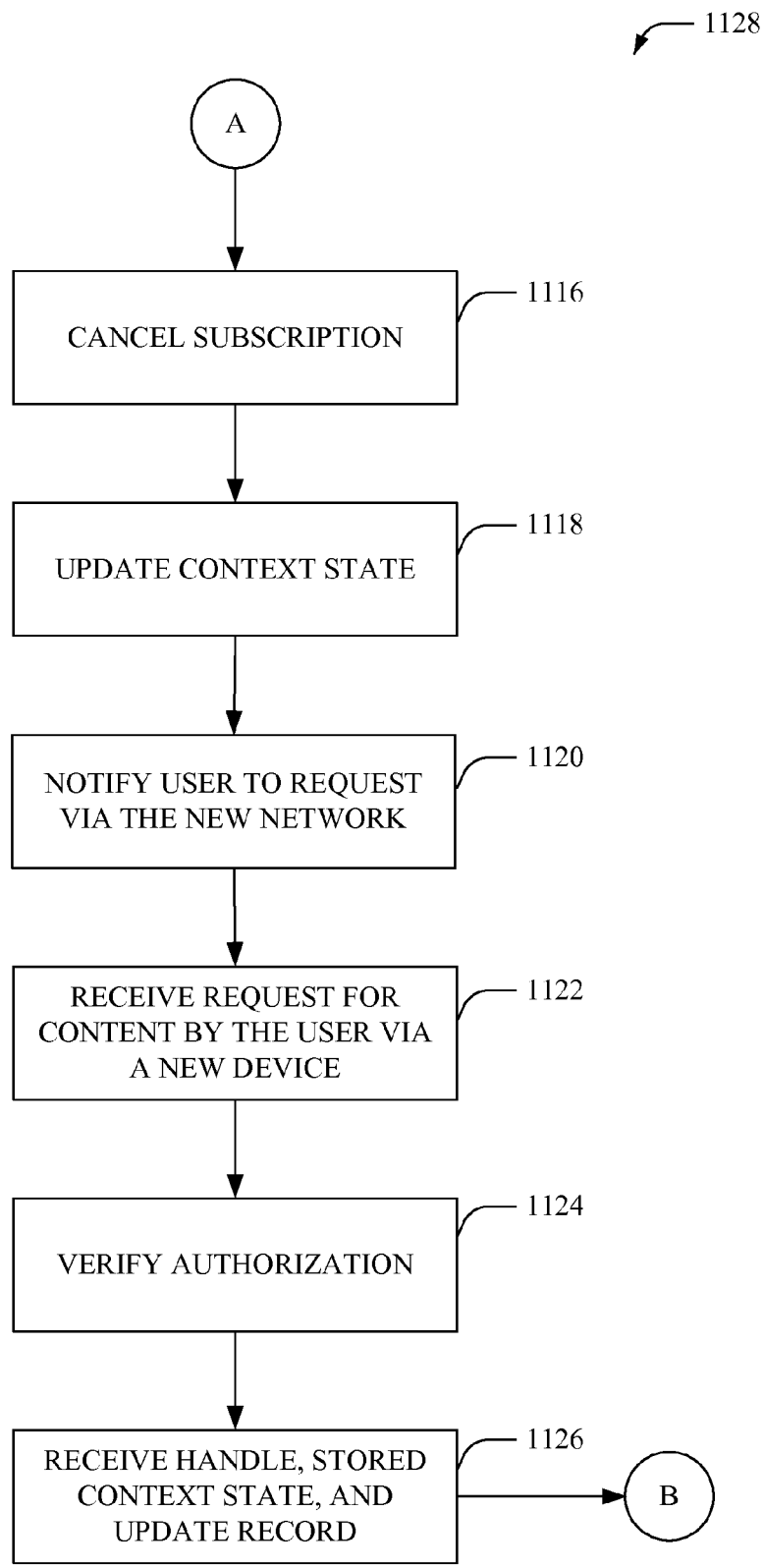

Referring to FIG. 11A, there illustrated is an example methodology 1100 that can be employed to seamlessly and efficiently deliver content during a change in network connection, according to an aspect of the disclosed subject innovation. At 1102, a request for content sent by a user connected to a network 1 can be received. The content can include, but is not limited to, video, audio, image, text, HTML, rich media objects, etc. and can be provided by an on-net or off-net content provider. At 1104, the authorization of the request can be verified. It can be appreciated that most any authorization technique can be employed for the verification. For example, location based restrictions, parental control, security, etc. can be applied to the received request based in part on user-defined settings, location of the user, time of request, content provider defined parameters, etc. According to an aspect, unauthorized requests can be denied and/or blocked.

At 1106, initial context associated with the authorized user can be stored. In one aspect, the initial context can include data associated with the user, such as, but not limited to, a user-id, device-id, etc. can be received during user registration. At 1108, content from a content provider can be delivered to the authorized user. In one aspect, the content can be delivered to the user by employing most any delivery method, for example, wireless Broadcast, multicast, unicast, etc. Further, at 1110, an optimal and/or preferred method for content delivery can be dynamically determined. At 1112, the content can be delivered to the user employing the optimal and/or preferred method. Accordingly, the content can be delivered to the user over network 1. According to an aspect, the user can connect to multiple networks and can switch between networks when desired. At 1114, a change in the user's network can be detected. The network change indication can be received, directly or indirectly, from the user. Referring to methodology 1128 in FIG. 11B, at 1116, a subscription generated on network 1, for example, by a SDF, can be cancelled. Further, at 1118, the initial context state associated with the content delivery session can be updated. The update can include data associated with the current state of the delivery session. For example, a state of a network DVR (Digital Video Recorder) can be stored that can include information that indicates if the DVR was being played, rewound, fast forwarded, etc. at a time when the change in network is detected. At 1120, a notification can be sent to the user to request for content over the new network (network 2).

At 1122, a request for content delivery can be received via the network 2. Further, at 1124, the authorization of the request can be verified by employing most any authorization technique. At 1126, the handle, stored context state for the authorized request can be received and updated. According to an aspect, on updating the context state, the content delivery session can begin delivery of content from a point where the delivery had stopped. The acts 1108-1112 are repeated until all the content is delivered. Additionally, if the user switched to another network during the delivery, acts 1114-1126 can be repeated.

Figure 12A:
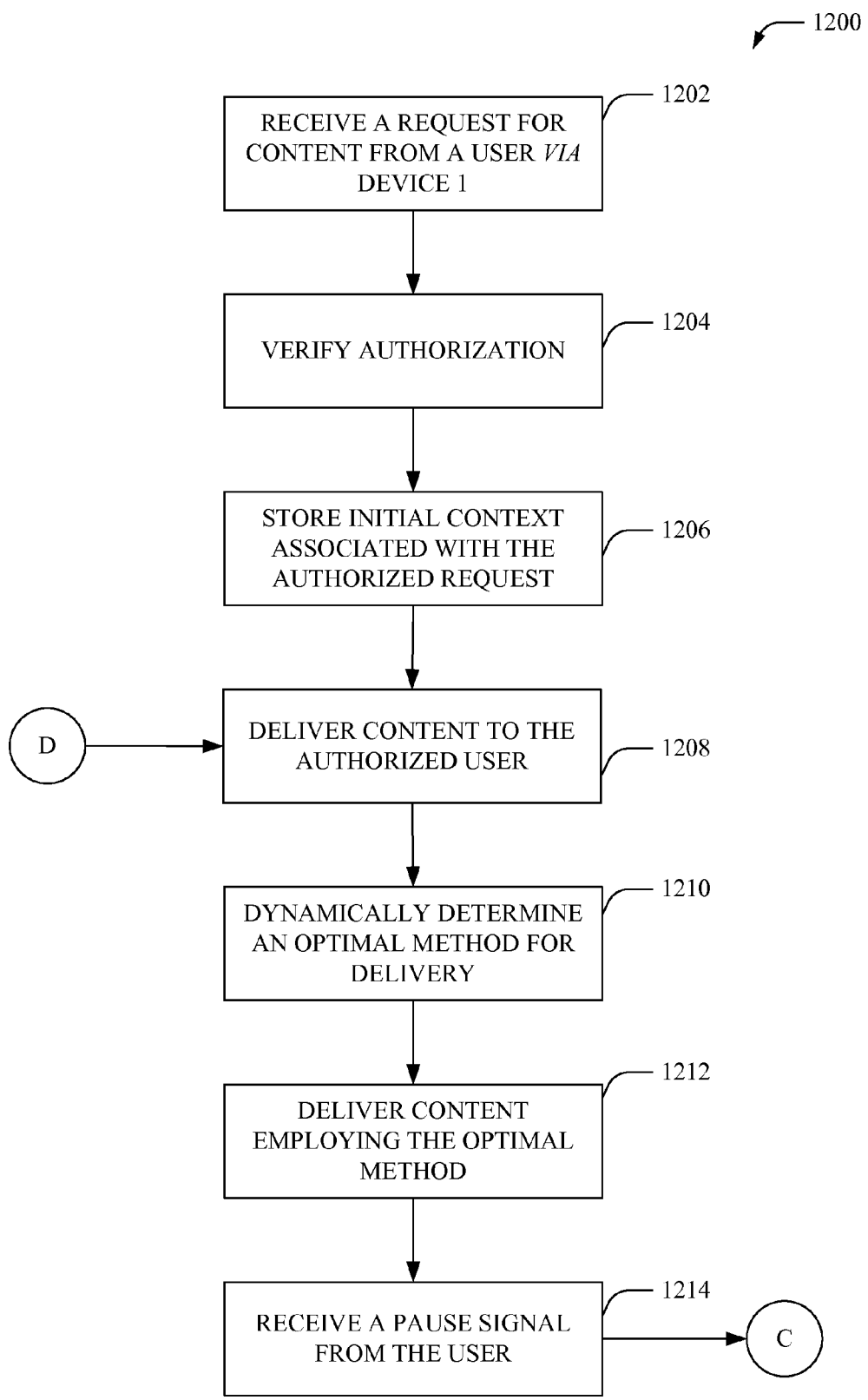
FIGS. 12A and 12 B illustrate example methodologies that can be employed to restore customer context data when a user switches to a new device during content delivery in accordance with an aspect of the subject disclosure.
Figure 12B:
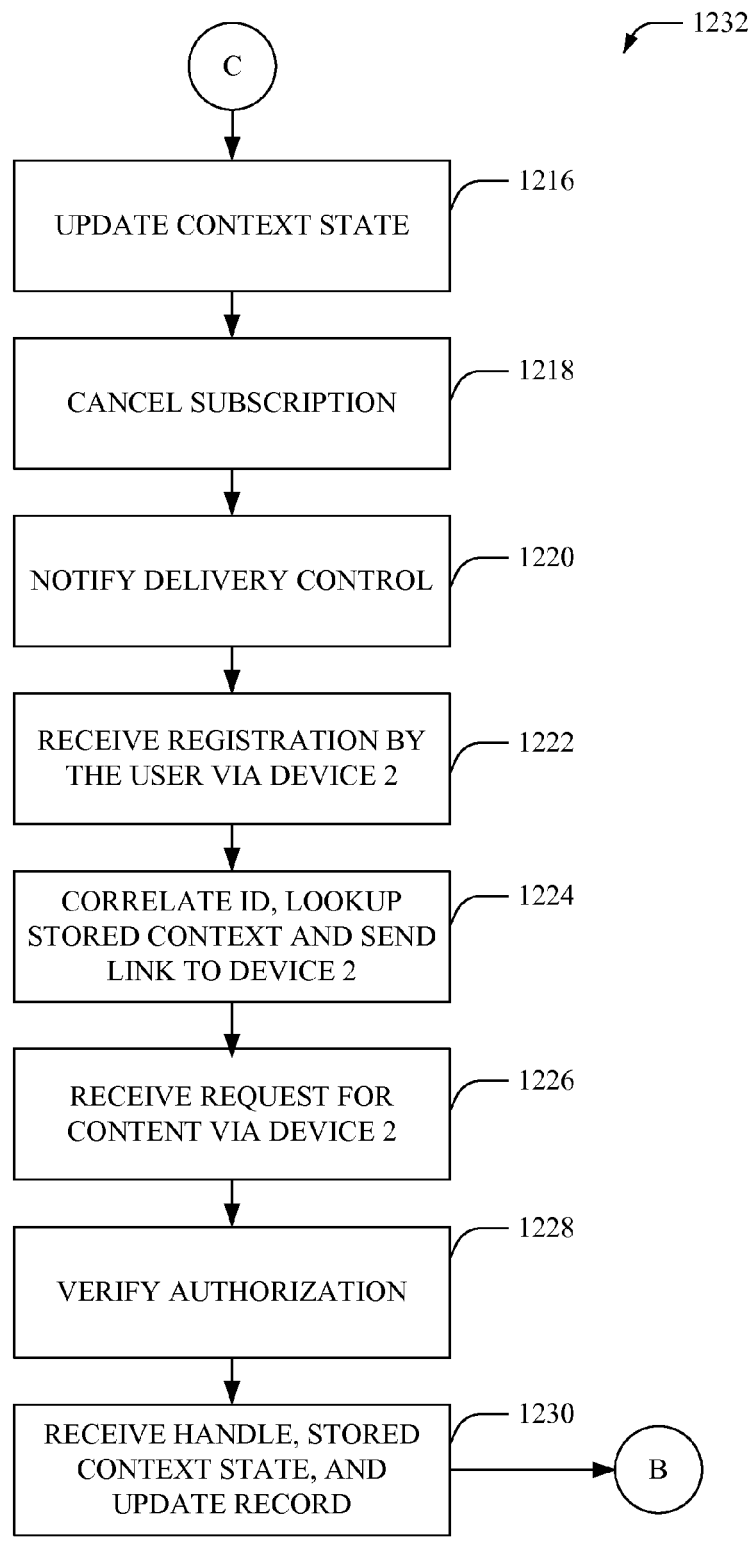

FIGS. 12A and 12B illustrate example methodologies 1200 and 1232 respectively, that can be employed to restore customer context data when a user switches to a new device during content delivery in accordance with an aspect of the subject disclosure. In one aspect, the devices employed by the user can include, but are not limited to, cellular phones, personal digital assistants (PDAs), laptops, personal computers, media players, televisions, premise devices, gateways, and the like. It can be appreciated that the new device can be connected to a new network or can even be connect to the same network that the old device is connected to.

Referring to FIG. 12A, at 1201, a request for content delivery can be received from the user via device 1. In one example, device 1 can be connected to a network 1, such as but not limited, a cellular network, WiFi network, Bluetooth network, etc. The content can include, but is not limited to, video, audio, image, text, HTML, rich media objects, etc. provided by an on-net or off-net content provider. At 1204, the authorization of the request can be verified. For example, most any authorization technique can be employed for the verification, such as, but not limited to, location based restrictions, parental control, security, etc. In one aspect, unauthorized requests can be denied and/or blocked.

At 1206 initial context, for example, user-id, device-id, authorization data, device capabilities, etc., associated with the authorized request can be stored. At 1208, content can be delivered to the user via device 1. At 1210, an optimal and/or preferred method for content delivery can be dynamically determined. It can be appreciated that the content can be delivered via most any delivery method, such as, but not limited to, wireless Broadcast, multicast, unicast, etc. At 1212, the content can be delivered to device 1 via the dynamically determined method. At 1214, a pause signal can be received from the user. The user can pause the current delivery session, for example, by pressing a pause button on device 1. Referring to methodology 1232 in FIG. 12B, at 1216, the initial context state associated with the content delivery session can be updated. Specifically, the update can include information that can indicate a point where the content delivery session has been paused. At 1218, a subscription generated for the device 1, for example, by a SDF, can be cancelled and at 1220, delivery control can be notified of the pause in content delivery.

Further, at 1222, registration can be received from the user via a device 2. At 1224, an id, such as, but not limited to, a user-id, handle and/or device-id for devices 1 and 2 can be correlated based in part on the registration information and the stored context information, and a link can be sent to the device 2 associated with the paused content delivery session. At 1226, a request can be received from device 2 for content delivery. Further, at 1228, the authorization of the request can be verified by employing most any authorization technique. At 1230, the handle, stored context state for the authorized request can be received and updated, such that, the content delivery session can begin delivery of content from a point where the delivery had been paused. Accordingly, the acts 1208-1212 can be repeated until all the content is delivered. In addition, the acts 1214-1130 can be repeated, if the user switches to a disparate device.

Figure 13:
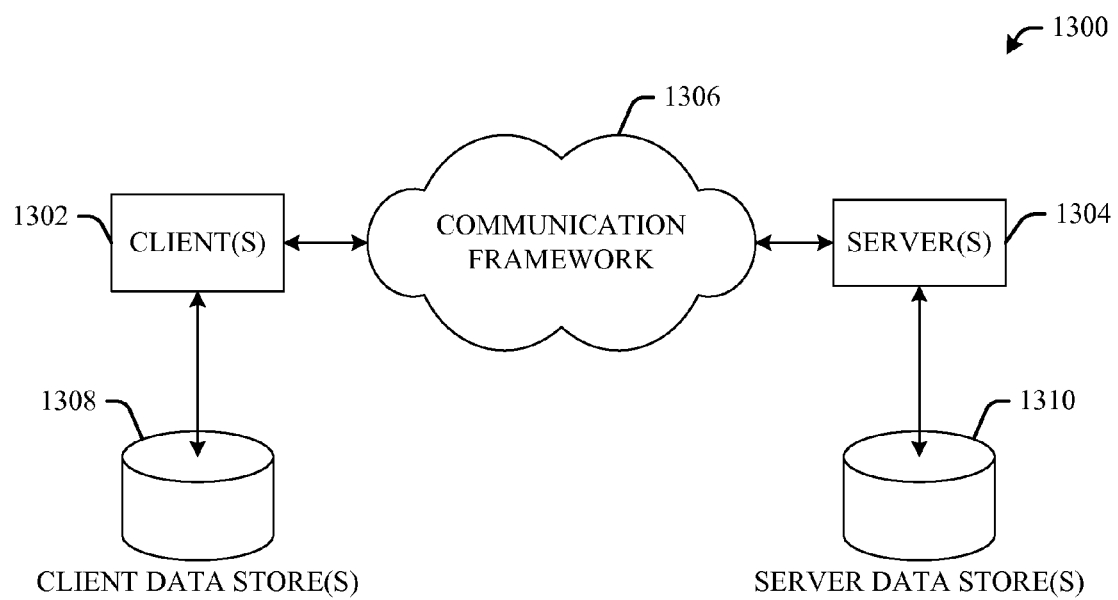
FIG. 13 illustrates a schematic block diagram of an exemplary computing environment in accordance with the subject innovation.

Referring now to FIG. 13, there is illustrated a schematic block diagram of a computing environment 1300 in accordance with the subject specification. The system 1300 includes one or more client(s) 1302. The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

Figure 14:
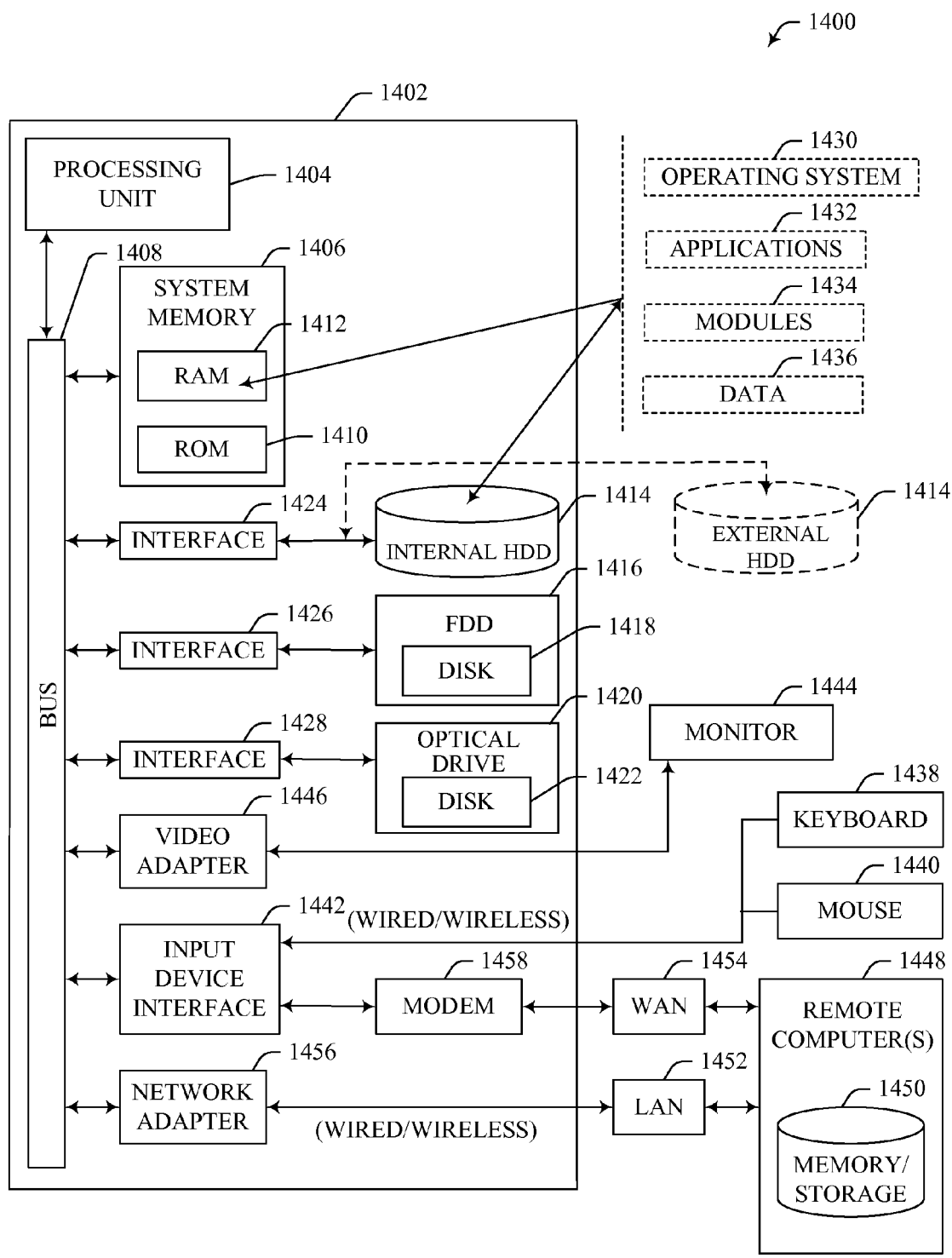
FIG. 14 illustrates a schematic block diagram depicting a suitable operating environment in accordance with an aspect of the subject innovation.

Referring now to FIG. 14, there is illustrated a block diagram of a computer operable to execute the disclosed architecture. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1344 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    a memory to store computer-executable instructions; and
    a processor communicatively coupled to the memory that facilitates execution of the computer-executable instructions to perform operations, comprising:
        determining a communication failure during a transmission associated with a content delivery session to a first user equipment via a first network,
        in response to the determining, storing context state data indicative of a first portion of content associated with the content delivery session that was delivered to the first user equipment via the first network prior to the communication failure,
        determining a second user equipment, coupled to a second network, to which a remaining portion of the content associated with the content delivery session is to be delivered based on a correlation of first identifier data associated with the first user equipment with second identifier data associated with the second user equipment,
        directing link data to the second user equipment, wherein the link data facilitates a restoration of the content delivery session based on the context state data, and
        facilitating the restoration of the content delivery session comprising facilitating a delivery of the remaining portion of the content to the second user equipment via the second network.

2. The system of claim 1, wherein the communication failure comprises an interruption in the content delivery session in response to the first user equipment being determined to have been switched off.

3. The system of claim 1, wherein the communication failure comprises an interruption in the content delivery session in response to a determination that an application failure associated with an application of the first user equipment has occurred.

4. The system of claim 1, wherein the communication failure comprises an interruption in the content delivery session in response to a determination a network failure is associated with the first network.

5. The system of claim 1, wherein the communication failure comprises an interruption in the content delivery session in response to a power level of the first user equipment being determined to satisfy a discharge criterion.

6. The system of claim 1, wherein the operations further comprise:
prior to the facilitating the delivery of the remaining portion of the content, modifying the remaining portion of the content based on network condition data associated with the second network.

7. The system of claim 1, wherein the facilitating the delivery of the remaining portion of the content comprises directing the remaining portion of the content to the second user equipment via a delivery protocol that is selected based on an analysis of network data associated with the second network.

8. The system of claim 7, wherein the delivery protocol comprises a broadcast delivery protocol.

9. The system of claim 7, wherein the delivery protocol comprises a unicast delivery protocol.

10. The system of claim 7, wherein the delivery protocol comprises a peer-to-peer delivery protocol.

11. The system of claim 1, wherein the operations further comprise:
requesting login data from the second user equipment, and
based on the login data, verifying authorization of the second user equipment prior to the directing the link data.

12. A method, comprising:
receiving, by a system comprising a processor, message data indicative of a communication failure during a transmission associated with a content delivery session directed to a first user equipment via a first network,
in response to the receiving, storing, by the system, context state data indicative of a first portion of content associated with the content delivery session that is delivered to the first user equipment via the first network prior to the communication failure;
determining, by the system, a second user equipment, coupled to a second network, to which a remaining portion of the content associated with the content delivery session is to be delivered, wherein the determining comprises determining the second user equipment based on a correlation of first identifier data associated with the first user equipment with second identifier data associated with the second user equipment;
directing, by the system, link data to the second user equipment, wherein the link data facilitates a restoration of the content delivery session based on the context state data; and
facilitating, by the system, the restoration of the content delivery session comprising facilitating a delivery of the remaining portion of the content to the second user equipment via the second network.

13. The method of claim 12, wherein the receiving comprises receiving the message data in response to determining that the first user equipment is switched off.

14. The method of claim 12, wherein the receiving comprises receiving the message data in response to determining an application failure associated with an application of the first user equipment has occurred.

15. The method of claim 12, wherein the receiving comprises receiving the message data in response to determining a network failure associated with the first network has occurred.

16. The method of claim 12, wherein the receiving comprises receiving the message data in response to determining that a power level of the first user equipment satisfies a discharge criterion.

17. A tangible computer readable medium comprising computer-executable executable instructions that, in response to execution, cause a system comprising a processor to perform operations, comprising:
receiving message data indicative of a communication failure during a transmission directed to a first user equipment via a first network, wherein the transmission is related to a content delivery session,
in response to the receiving, storing context state data indicative of a first portion of content associated with the content delivery session that has been determined to have been delivered to the first user equipment via the first network prior to the communication failure;
determining that a second portion of the content associated with the content delivery session is to be delivered to second user equipment via a second network based in part on a correlation of first identifier data associated with the first user equipment with second identifier data associated with the second user equipment,
directing link data to the second user equipment, wherein the link data facilitates a restoration of the content delivery session based on the context state data; and
facilitating, by the system, the restoration of the content delivery session comprising facilitating a delivery of the second portion of the content to the second user equipment via the second network.

18. The tangible computer readable medium of claim 17, wherein the facilitating the delivery of the second portion of the content comprises directing the second portion of the content to the second user equipment via a broadcast transmission.

19. The tangible computer readable medium of claim 17, wherein the facilitating the delivery of the second portion of the content comprises directing the second portion of the content to the second user equipment via a unicast transmission.

20. The tangible computer readable medium of claim 17, wherein the facilitating the delivery of the second portion of the content comprises directing the second portion of the content to the second user equipment formatted according to a peer-to-peer transmission protocol.

* * * * *